United States Patent
Kano et al.

(10) Patent No.: US 7,191,024 B2
(45) Date of Patent: Mar. 13, 2007

(54) REMOTE CONTROL METHOD AND APPARATUS, REMOTE CONTROLLER, AND APPARATUS AND SYSTEM BASED ON SUCH REMOTE CONTROL

(75) Inventors: Masaya Kano, Hamamatsu (JP); Takanori Shimizu, Hamamatsu (JP)

(73) Assignee: Yamaha Coproration, Hamamatsu (JP)

( * ) Notice: Subject to any disclaimer, the term of this patent is extended or adjusted under 35 U.S.C. 154(b) by 798 days.

(21) Appl. No.: 10/038,029

(22) Filed: Oct. 19, 2001

(65) Prior Publication Data

US 2002/0149704 A1 Oct. 17, 2002

(30) Foreign Application Priority Data

Nov. 2, 2000 (JP) .............................. 2000-335332
Nov. 15, 2000 (JP) .............................. 2000-348646

(51) Int. Cl.
*G06F 17/00* (2006.01)
*G04B 10/02* (2006.01)
*H04B 1/20* (2006.01)

(52) U.S. Cl. ............... 700/94; 340/825.24; 340/825.25

(58) Field of Classification Search ............... 381/105, 381/103, 102, 98; 340/825.25, 825.24; 348/14.02, 348/14.05, 734

See application file for complete search history.

(56) References Cited

U.S. PATENT DOCUMENTS 3,944,982 A * 3/1976 Mogi et al. .................. 367/197

(Continued)

FOREIGN PATENT DOCUMENTS

| JP | 9018971 | 1/1997 |
| JP | 10-063458 | 3/1998 |
| JP | 2000-197162 A | 7/2000 |
| WO | WO 94/02920 | 2/1994 |

OTHER PUBLICATIONS

Real Jukebox Plus Manual; Real Networks; 1999.*
Real Jukebox Plus Manual; Real Networks; 1999.*
Dictionary.com definition of remote control.*
Real Jukebox Plus Manual; Real Networks; 1999.*

*Primary Examiner*—Sinh Tran
*Assistant Examiner*—Andrew C Flanders
(74) *Attorney, Agent, or Firm*—Pillsbury Winthrop Shaw Pittman LLP

(57) ABSTRACT

When a user gives a parameter storage instruction via a remote controller, current settings of parameters in an input switching circuit, surround circuit, graphic equalizer and electronic volume are stored into a non-volatile RAM. Then, once the user gives a reproduction instruction via the remote controller, the stored settings of the parameters are read out from the non-volatile RAM and set to the input switching circuit, surround circuit, graphic equalizer and electronic volume. Once the user selects a desired one of customizing buttons that are provided on the remote controller belonging to an audio apparatus connected with a personal computer and selects functions to be allocated to the selected customizing button, the personal computer creates setting information in accordance with the user's selections, and transmits the thus-created setting information to the audio apparatus. In turn, the audio apparatus stores the allocated functions of the customizing button on the basis of the setting information.

10 Claims, 27 Drawing Sheets

U.S. PATENT DOCUMENTS

| | | | |
|---|---|---|---|
| 5,524,290 A | * | 6/1996 | Ecklund et al. .......... 455/200.1 |
| 5,581,621 A | * | 12/1996 | Koyama et al. ............ 381/103 |
| 5,881,103 A | * | 3/1999 | Wong et al. ................ 375/229 |
| 5,900,867 A | * | 5/1999 | Schindler et al. ........... 715/719 |
| 6,092,067 A | * | 7/2000 | Girling et al. .............. 707/100 |
| 6,211,870 B1 | * | 4/2001 | Foster ....................... 715/744 |
| 6,341,166 B1 | * | 1/2002 | Basel ........................ 381/103 |
| 6,704,421 B1 | * | 3/2004 | Kitamura .................... 381/103 |

* cited by examiner

FIG. 10A

| CONTROL COMMAND | FUNCTION |
|---|---|
| COMMAND A | FM/AM SWITCHING PROCESS |
| COMMAND B | ......... |
| ... | |

FIXED ALLOCATION INFORMATION TABLE

FIG. 10B

| CONTROL COMMAND | OPERATION FLAG | FUNCTION 1 | | FUNCTION 2 | | FUNCTION 3 | | ... | FUNCTION N | |
|---|---|---|---|---|---|---|---|---|---|---|
| | | FLAG | SET VALUE | FLAG | SET VALUE | FLAG | SET VALUE | ... | FLAG | SET VALUE |
| COMMAND C1 | 0 | 0 | 3 | 0 | 4 | 0 | 5 | ... | 1 | 0 |
| COMMAND C2 | 1 | 1 | 0 | 1 | 0 | 1 | 0 | ... | 1 | 0 |
| COMMAND C3 | 2 | 1 | 0 | 1 | 0 | 1 | 0 | ... | 1 | 0 |

CUSTOMIZED ALLOCATION INFORMATION TABLE

| CONTROL COMMAND | FUNCTION |
|---|---|
| CONTROL COMMAND C1 | MAXIMIZE SIZE OF DETAILED SETTING SCREEN |
| . . . | . . . |

ALLOCATION INFORMATION TABLE OF PC

| CONTROL COMMAND | OPERATING TIME/DATE CONDITION | OPERATION FLAG | FUNCTION 1 | | FUNCTION 2 | | ... | FUNCTION N | |
|---|---|---|---|---|---|---|---|---|---|
| | | | FLAG | SET VALUE | FLAG | SET VALUE | ... | FLAG | SET VALUE |
| COMMAND C1 | WEEKDAY 9:00~20:00 | | | | | | | | |
| | OTHERS | | | | | | | | |
| COMMAND C2 | WEEKDAY 9:00~20:00 | | | | | | | | |
| | OTHERS | | | | | | | | |
| COMMAND C3 | WEEKDAY 9:00~20:00 | | | | | | | | |
| | OTHERS | | | | | | | | |

CUSTOMIZED ALLOCATION INFORMATION TABLE

FIG. 24

DOWNLOAD OF RECOMMENDED SETTING
INFORMATION HAS BEEN COMPLETED

DO YOU WANT TO PERFORM CUSTOMIZED
FUNCTION SETTING FOR AUDIO APPARATUS
USING DOWNLOADED RECOMMENDED
SETTING INFORMATION

EXECUTE SETTING

REMOTE CONTROL METHOD AND APPARATUS, REMOTE CONTROLLER, AND APPARATUS AND SYSTEM BASED ON SUCH REMOTE CONTROL

BACKGROUND OF THE INVENTION

The present invention relates to an improved control method and remote controller which can set a plurality of parameters of an apparatus to desired states through simple operation of the remote controller, as well as an electronic apparatus based on the control method.

The present invention also relates to an improved control method and apparatus for use with audio apparatus, as well as an improved audio system and a computer system based on such remote control.

The general type of remote control signal transmitter (remote controller) is designed to transmit one code per one key operation by the user, and thus, in order to control a plurality of parameters of a given apparatus, it is necessary for the user to perform separate key operation for each of the parameters. For example, where the user wants to set the input switching of an AV amplifier (Audio/Visual main preamplifier) to "AUX" (auxiliary input), the surround mode switching to "Dolby ProLogic" (trademark), volume level to "30" and graphic equalizer to "raise high and low frequency bands", it is necessary to sequentially carry out the following operation.

(1) Depress the power button to turn on the main power supply.

(2) Depress the input switching button to set the input to "AUX". If there are five input channels, then the input switching button has to be depressed or operated four times at the maximum.

(3) Depress the surround mode switching button to set the mode to "Dolby ProLogic". If there are eight surround modes, the surround mode switching button has to be operated seven times at the maximum.

(4) Depress the volume button to set the volume level to "30".

(5) Depress the graphic equalizer button to select desired frequency bands.

(6) Depress the up/down button to set a level.

(7) Repeat the operation in items (5) and (6) above.

As noted above, the conventional remote control signal transmitters require user's key operation per parameter in order to control a plurality of parameters of an apparatus, which is very laborious and time-consuming. Further, preferred parameter settings of the apparatus tend to differ considerably depending on the desired sound/picture source, such as a CD, video, DVD or game, to be viewed and/or listened or on the person viewing and/or listening to the sound/picture source, and it is very troublesome to change the settings each time one sound/picture source or listening person changes to another. Although there presently exit programmable remote controllers capable of sequentially transmitting a plurality of codes per one key operation, the necessary programming operations are very laborious and time-consuming. Further, in normal cases, the microcomputer incorporated in such programmable remote controllers must be a custom-made microcomputer rather than a general-purpose microcomputer, and thus the programmable remote controllers are generally expensive.

In general, many audio apparatus known today are supplied along with a separate remote control signal transmitter (remote controller). Namely, the user can control the audio apparatus even from a distance by manipulating the remote control signal transmitter as appropriate; for example, a sound volume parameter can be controlled by manipulation of the remote control signal transmitter.

Further, the recent audio apparatus are designed to perform a variety of functions, and it will be much more convenient if such a variety of functions can be performed by the user manipulating the remote control signal transmitter. Therefore, the audio apparatus of the ordinary type are supplied along with a sophisticated remote control signal transmitter having various buttons for selecting any desired one of the various functions. When the user selects one of the buttons on the remote control signal transmitter which corresponds to a desired one of the functions, a command instructing execution of the desired function is transmitted from the remote control signal transmitter to the audio apparatus, which in turn performs the user-instructed function.

However, the conventional remote control signal transmitters added to the audio apparatus capable of performing a variety of functions tend to have an increased size due to the provision of the many function selecting buttons.

Although the remote control signal transmitters are provided with the many function selecting buttons, the user of each of the remote control signal transmitters tends to actually use only limited ones of the functions, i.e. function selecting buttons. Thus, the provision of the many function selecting buttons on the remote control signal transmitter would significantly complex the function selecting operation to be performed by the user or often involve erroneous selecting operation. In view of these inconveniences, it is conceivable to provide the remote control signal transmitters with only the buttons corresponding to the functions actually used by the users. However, because the functions frequently used by the users considerable differ from one user to another depending on the interests and the like of the users, it is difficult to decide which function selecting buttons should be provided on the remote control signal transmitters, and thus it is difficult to make remote control signal transmitters which can appropriately meet demands and requests of all potential users.

As one solution to the above-discussed problem, a more sophisticated remote control signal transmitter has been proposed which is equipped with a visual display section and causes the display section to function as a GUI (Graphical User Interface) so that various kinds of commands can be transmitted to the audio apparatus without provision of many buttons on the remote control signal transmitter. However, such a remote control signal transmitter is undesirably complex in construction.

Further, an audio system has recently been developed in which an audio apparatus having various sound control functions is connected to a general-purpose personal computer. In this audio system, tone signals generated by the personal computer are sent to the audio apparatus, which processes each of the tone signals to output the resultant processed tone signal. To the audio system is added a separate remote control signal transmitter which allows the user to remote-control the audio apparatus. However, the user can not use the remote control signal transmitter to control the personal computer, so that when both the audio apparatus and the personal computer are to be remote-controlled, there have to be provided another remote control signal transmitter, signal reception unit, etc. for remote-controlling the personal computer. Thus, the remote control signal transmitter added to the audio apparatus can not be said to be a user-friendly, convenient device for remote-controlling the audio system comprising the audio apparatus and personal computer.

SUMMARY OF THE INVENTION

In view of the foregoing, it is an object of the present invention to provide an improved control method and remote controller which can set a plurality of parameters of an electronic apparatus to desired states through simple operation of the remote control signal transmitter, as well as an improved electronic apparatus based on the control method.

It is another object of the present invention to provide a control method and apparatus for use with audio apparatus which can implement a user-friendly, convenient remote controller of simple construction without requiring cumbersome remote control setting.

According to one aspect of the present invention, there is provided a method for controlling parameters to be set in an apparatus in response to user operation of a remote controller, which comprises: a step of receiving a storage instruction signal transmitted from the remote controller, by means of a signal reception section of the apparatus; a step of storing settings of a plurality of parameters, currently set in the apparatus, into a memory of the apparatus in response to the storage instruction signal received from the remote controller; a step of receiving a reproduction instruction signal transmitted from the remote controller, by means of the signal reception section of the apparatus; a step of reading out the settings of the parameters stored in the memory, in response to the reproduction instruction signal received from the remote controller; and a step of controlling a plurality of parameters to be set in the apparatus, on the basis of the settings read out from the memory by the step of reading out. Because the plurality of parameters to be set in the apparatus can be controlled to assume the states or contents represented by the settings read out from the memory of the apparatus in the above-described manner, the present invention can readily set the plurality of parameters to desired states through simple operation of the remote controller.

According to another aspect of the present invention, there is provided an apparatus (electronic apparatus) which comprises: a controlled section; a signal reception section that receives a control signal transmitted from a remote controller; a control section that identifies an instruction indicated by the control signal received from the remote controller by the signal reception section and, on the basis of the identified instruction, controls parameters to be set in the controlled section; and a first memory that stores settings of a plurality of parameters to be set in the controlled section. In this invention, when the control section identifies a predetermined storage instruction indicated by the control signal from the remote controller, the control section stores first settings of a plurality of parameters, currently set in the controlled section, into the first memory in response to the storage instruction. When the control section identifies a predetermined first reproduction instruction indicated by the control signal from the remote controller, the control section reads out the first settings from the first memory in response to the first reproduction instruction, and then, on the basis of the first settings read out from the first memory, controls a plurality of parameters to be set in the controlled section.

The inventive apparatus may further comprise a second memory that stores second settings of a plurality of parameters currently set in the controlled section, and, on the basis of the second settings stored in the second memory, the control section may control a plurality of parameters to be set in the controlled section. Thus, when the control section identifies the predetermined storage instruction indicated by the control signal from the remote controller, the control section transfers the second settings stored in the second memory to the first memory for storage therein, and when the control section identifies the first or second reproduction instruction indicated by the control signal from the remote controller, the control section transfers the first or second settings stored in the first memory to the second memory for storage therein. Further, when the control section identifies the first or second reproduction instruction, the control section transfers the first or second settings stored in the first memory to the second memory for storage therein and, after the storage of the first or second settings into the second memory, the control section controls a plurality of parameters to be set in the controlled section on the basis of the settings stored in the second memory. Further, the control section may measure a length of time over which a predetermined control signal transmitted from the remote controller has been continuously detected. In this case, when the predetermined control signal has been continuously detected for more than a predetermined time length, the control section judges the predetermined control signal to be the storage instruction, but when the predetermined control signal has been continuously detected for less than the predetermined time length, the control section judges the predetermined control signal to be the reproduction instruction.

The inventive apparatus may be an audio amplifier, and the plurality of parameters may include at least parameters pertaining to at least two of input switching, surround setting, sound volume setting and frequency characteristic setting. Further, when the control section identifies a predetermined reproduction instruction indicated by the control signal from the remote controller while a main power supply for driving the controlled section is not in an ON state, the control section may also perform control to turn on the main power supply. Further, the first memory may be a non-volatile memory while the second memory may be a volatile memory.

According to still another aspect of the present invention, there is provided a remote controller which comprises: a first signal transmission section that, in response to first operation by a user, transmits, to an apparatus (electronic apparatus), a first control signal for controlling a plurality of parameters to be set in the apparatus; and a second signal transmission section that, in response to second operation by a user, transmits, to the apparatus, a second control signal for storing settings of a plurality of parameters, currently set in the apparatus, into a memory of the apparatus.

The remote controller of the invention may further comprise a third signal transmission section that, in response to third operation by a user, transmits, to the apparatus, a third control signal for reading out, from another memory of the apparatus, settings of a plurality of parameters to be set in the apparatus. In this case, a plurality of parameters to be set in the apparatus are collectively controlled on the basis of the settings read out from the other memory of the apparatus. The inventive remote controller may further comprise an operator to be used for both of the second operation and the third operation.

According to another important aspect of the present invention, there is provided a method for controlling allocation information (control or function allocation information) set in an audio apparatus, which comprises: a step of creating, by means of a computer system, setting information to be transmitted to the audio apparatus in accordance with an instruction entered by a user; a step of transmitting the setting information, created by the step of creating, from the computer system to the audio apparatus; and a step of causing the audio apparatus to store allocation information into a storage section of the audio apparatus in accordance with the setting information received from the computer system. In this case, the allocation information is used when the audio apparatus, in accordance with a control signal transmitted from a remote controller and instructing the audio apparatus to perform a predetermined control process, performs the predetermined control process indicated by the control signal.

The method of the invention may further comprise a control step, and the setting information created by the step of creating may be information to be used by the control step for controlling a plurality of pieces of the allocation information to be stored in the storage section. The method of the invention may further comprise a control step, and the setting information created by the step of creating may be information to be used by the control step for controlling, for each of a plurality of predetermined conditions, the allocation information to be stored in the storage section. The method of the invention may further comprise a step of causing the computer system to receive recommended information from a server via a communication network. The recommended information may include information for creating recommended setting information and information for prompting the user to enter an instruction for creating the setting information.

According to still another aspect of the present invention, there is provided a computer system for controlling allocation information stored in a storage section of an audio apparatus, which comprises: a creation section that creates setting information to be transmitted to the audio apparatus in accordance with an instruction entered by a user, the setting information being information for storing allocation information into the storage section of the audio apparatus, the allocation information being used when the audio apparatus, in accordance with a control signal transmitted from a remote controller and instructing the audio apparatus to perform a predetermined control process, performs the predetermined control process indicated by the control signal; and a transmission section that transmits the setting information, created by the creation section, to the audio apparatus.

The setting information created by the creation section may be information for controlling a plurality of pieces of the allocation information stored in the storage section. Alternatively, the setting information created by the creation section may be information for controlling, for each of a plurality of predetermined conditions, the allocation information stored in the storage section. The computer system of the invention further comprise: a recommended information reception section that receives recommended information from a server via a communication network, the recommended information including first information for creating recommended setting information and second information for prompting the user to enter an instruction for creating the setting information; and a section that, on the basis of the second information included in the recommended information received from the server by the recommended information reception section, prompts the user to enter the instruction for creating the setting information.

The present invention may also be implemented as a computer program for causing a computer system to perform the above-described method for controlling allocation information (control or function allocation information) stored in a storage section of an audio apparatus.

According to still another aspect of the present invention, there is provided an audio system comprising an audio apparatus controllable via a remote controller and a computer system connected with the audio apparatus. In this audio system, the audio apparatus comprises: a first reception section that receives a control signal transmitted from the remote controller; a first control process section that executes a first control process on the basis of the control signal received from the remote controller by the first reception section; and a transmission section that transmits the control signal, received by the first reception section, to the computer system. In this audio system, the computer system comprises: a second reception section that receives the control signal transmitted from the transmission section of the audio apparatus; and a second control process section that executes a second control process on the basis of the control signal received by the second reception section.

In the audio system of the invention, the audio apparatus may further comprise a storage section that stores transmission setting information indicative of whether or not the control signal received by the first reception section should be transmitted to the computer system. The transmission section of the audio apparatus transmits the received control signal to the computer system when the transmission setting information indicating that the control signal received by the first reception section should be transmitted to the computer system is stored in the storage section. The first control process section executes the first control process on the basis of the control signal received by the first reception section, when the transmission setting information indicating that the control signal received by the first reception section should not be transmitted to the computer system is stored in the storage section. The audio apparatus may further comprise a transmission setting writing section that rewrites contents of the transmission setting information stored in the storage section on the basis of the control signal received from the remote control by the first reception section. The second control process section of the computer system may control operation of application software related to the audio apparatus.

According to still another important aspect of the present invention, there is provided a method for controlling a computer system connected with an audio apparatus, which comprises: a first reception step of causing the audio apparatus to receive a control signal transmitted from the remote controller; a transmission step of causing the audio apparatus to transmit the control signal, received by the first reception step, to the computer system; a second reception step of causing the computer system to receive the control signal transmitted by the transmission step; and a control process step of executing a predetermined control process on the basis of the control signal received by the second reception step.

The present invention also provides an audio apparatus controllable via a remote controller, which comprises: a reception section that receives a control signal transmitted from the remote controller; a control process section that executes a control process on the basis of the control signal received from the remote controller by the reception section; and a transmission section that transmits the control signal, received by the reception section, to a computer system.

BRIEF DESCRIPTION OF THE DRAWINGS

For better understanding of the object and other features of the present invention, its preferred embodiments will be described hereinbelow in greater detail with reference to the accompanying drawings, in which:

FIGS. 10A and 10B are diagrams showing exemplary contents of an allocation information table stored in a RAM of the audio apparatus

FIG. 24 is a diagram showing a modification of the function allocation table;

FIG. 28 is a diagram showing another screen displayed on the display section of the personal computer when functions to be allocated to the customizing button are to be set using the Internet.

DETAILED DESCRIPTION OF THE PREFERRED EMBODIMENTS

The following will describe embodiments of the present invention, but it should be appreciated that the present invention is not limited to the described embodiments and various modifications of the invention are possible without departing from the basic principles. The scope of the present invention is therefore to be determined solely by the appended claims.

Figure 1:
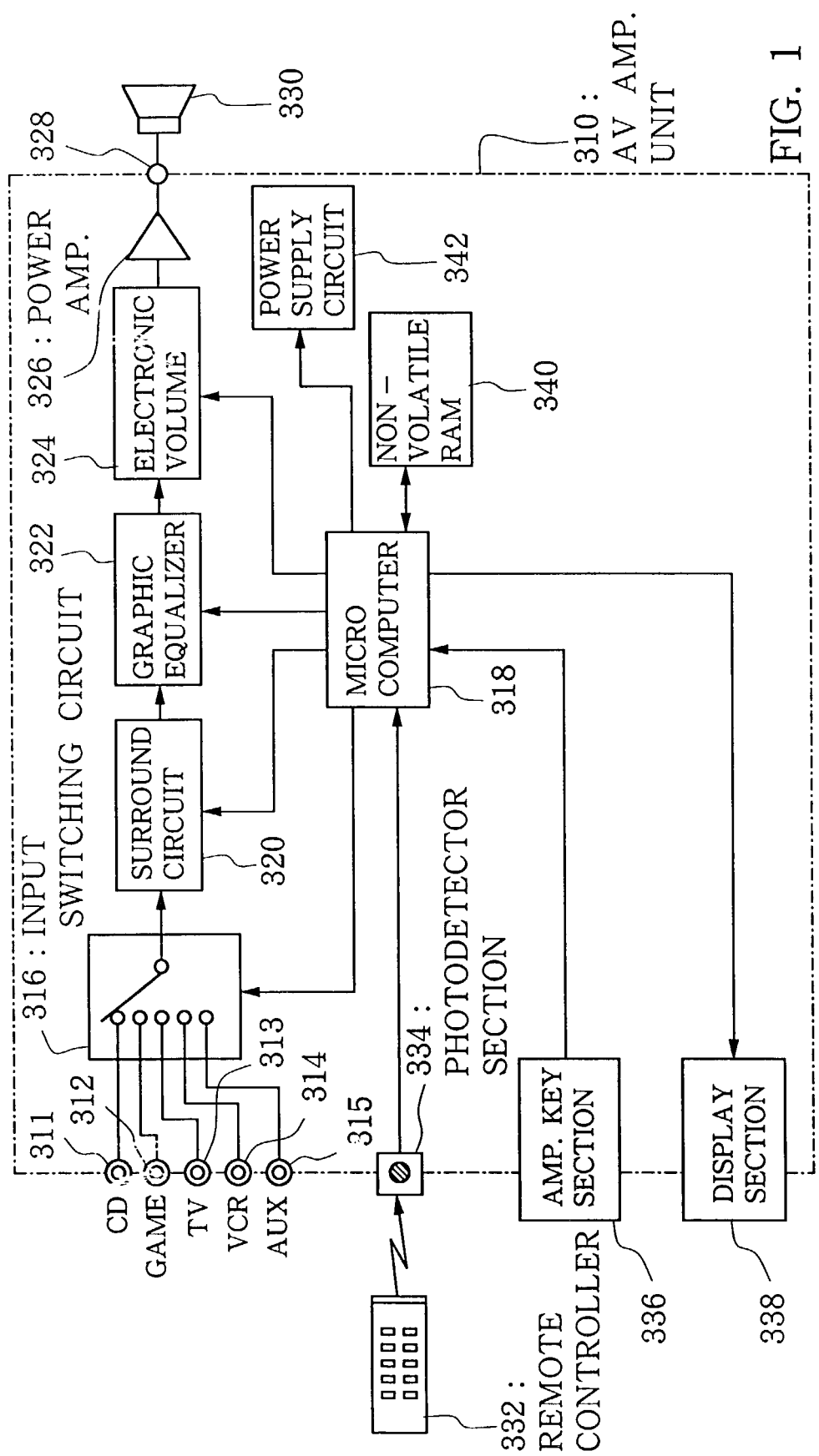
FIG. 1 is a block diagram showing an overall configuration of a system in accordance with an embodiment of the present invention.

Now, a description will be made about a system in accordance with an embodiment of the present invention which is applied to remote control of an AV (AudioVideo) amplifier unit 310. FIG. 1 is a block diagram showing an overall system configuration, which particularly shows circuitry of only one of a plurality of channels within the AV amplifier unit 310. The AV amplifier unit 310 includes a plurality of audio signal input terminals 311–315 for connection with sound/picture source, such as a compact disk player (CD), electronic game apparatus (GAME), television set (TV), video tape deck (VCR) and other sound/picture source apparatus (AUX), so that audio signals can be input to the AV amplifier unit 310 from any desired one of the sound/picture source apparatus via the corresponding input terminal. Input switching circuit 316 selects any one of the above-mentioned audio signal input terminals 311–315, i.e. the sound/picture source apparatus, in accordance with an instruction given from a one-chip microcomputer 318. Note that the microcomputer 318 may be implemented by an inexpensive general-purpose microcomputer. Each audio signal input via the selected audio signal input terminal is imparted with a surround effect by a surround circuit 320, adjusted in frequency characteristic by a graphic equalizer 322, further adjusted in sound volume by an electronic volume 324, then output from a speaker terminal 328 via a power amplifier 326, and then audibly reproduced or sounded via a speaker 330. The surround circuit 320 comprises a DSP (Digital Signal Processor), and any one of a plurality of surround modes can be set by the surround circuit 320.

Each remote control signal (in this case, infrared signal) is received by a signal reception section (in this case, photodetector section) 334 and then supplied to the microcomputer 318, where a remote control code represented by the control signal is analyzed and the decoded or identified. Amplifier section 336 is provided 0n the AV amplifier unit 310 for the user to perform, on the main body of the amplifier unit 310 rather than on a remote control signal transmitter (remote controller) 332, manual operation, such as turning on/off of the main power supply, input switching, surround setting, frequency characteristic setting and sound volume setting, similar to that preformable on the transmitter 332. Non-volatile RAM (setting storage memory) 340, in response to a storage instruction given from the remote control signal transmitter 332, stores current settings (controlled contents) of individual parameters, such as the input switching, surround setting, frequency characteristic setting and sound volume setting, of the AV amplifier unit 310 at the time point the storage instruction has been given. The non-volatile RAM 340 may be implemented by an EEPROM (Electrically Erasable Program Read-Only Memory), flash memory or the like. Examples of various types and values of the parameters stored in the non-volatile RAM 340 are shown in Table 1.

TABLE 1

| Parameter Type | Value (meaning of the value is given in parentheses) |
| --- | --- |
| input switching | 0 (CD), 1 (GAME), 2 (TV), 3 (VCR), 4 (AUX) |
| surround | 0 (off), 1 (Dolby ProLogic), 2 (church), 3 (concert hall) |
| sound volume | 0 (0 dB), 1 (−1 dB), 2 (−2 dB), . . . |
| graphic equalizer (100 Hz) | 0 (−10 dB), 1 (−9 dB), 2 (−8 dB), . . . |
| graphic equalizer (350 Hz) | 0 (−10 dB), 1 (−9 dB), 2 (−8 dB), . . . |
| graphic equalizer (1 kHz) | 0 (−10 dB), 1 (−9 dB), 2 (−8 dB), . . . |
| graphic equalizer (3.5 kHz) | 0 (−10 dB), 1 (−9 dB), 2 (−8 dB), . . . |
| graphic equalizer (10 kHz) | 0 (−10 dB), 1 (−9 dB), 2 (−8 dB), . . . |

Visual display section 338, which comprises an LCD (Liquid Crystal Display) or the like, displays the current settings of the parameters of the AV amplifier unit 310. Power supply circuit 342 supplies power to various components of the AV amplifier unit 310. While the main power supply is in an OFF state, the power supply circuit 342 does not feed power to the audio signal processing circuit 316, 320, 322, 324 and 326 but keeps feeding power at least to the microcomputer 318 and photodetector section 334 so as to permit constant reception of the remote control signals from the signal transmitter 332.

In response to user operation on the remote control signal transmitter 332 or on the amplifier key section 336, the microcomputer 318 controls the input switching by the input switching circuit 316, surround mode switching by the surround circuit 320, frequency characteristic adjustment by the graphic equalizer 322, sound volume adjustment by the electronic volume 324, ON/OFF of the power supply circuit 342, write/read on the non-volatile RAM 340, display by the display circuit 338, or the like.

Figure 2:
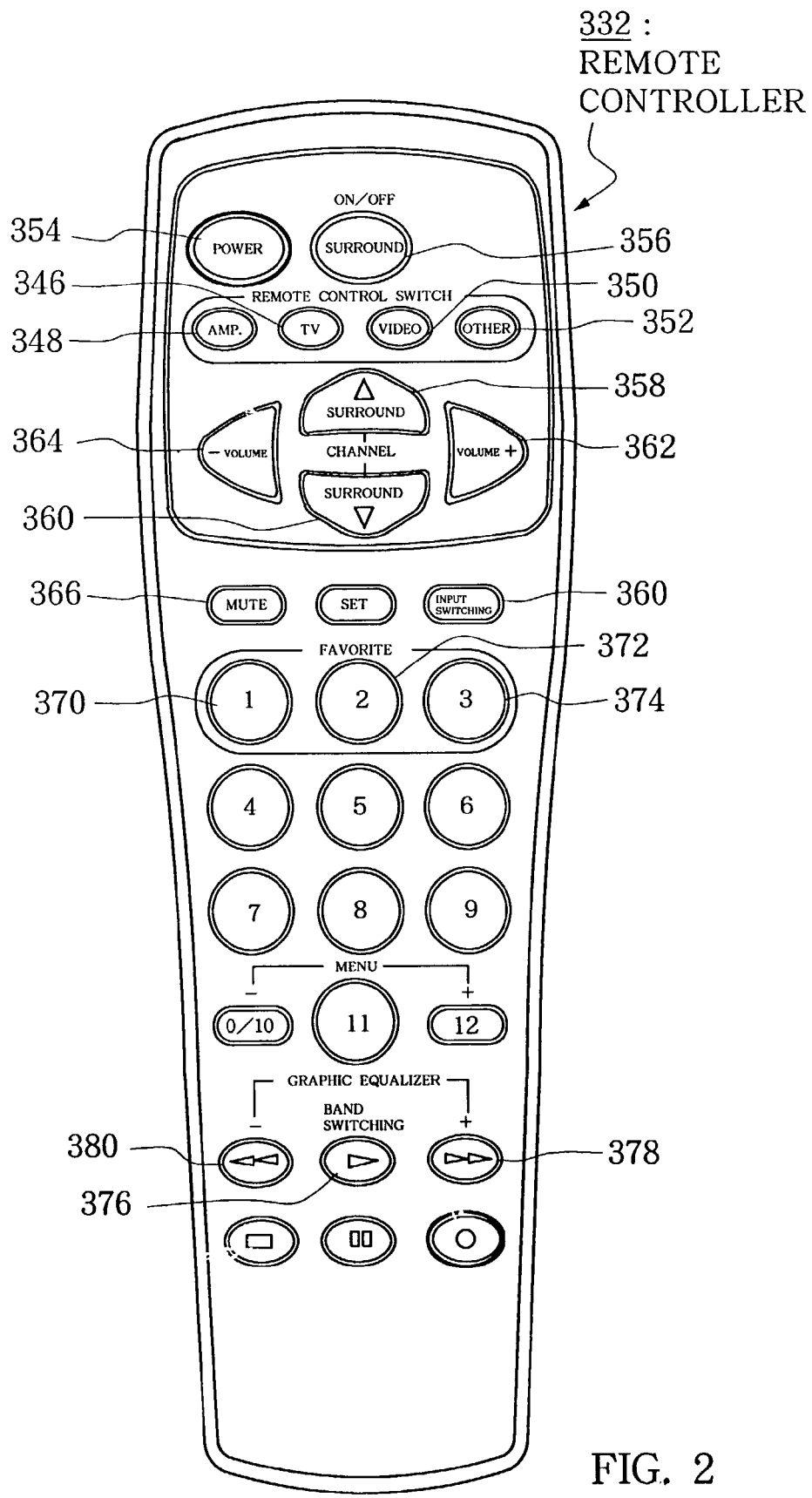
FIG. 2 is a view showing a specific example of key arrangement on a remote control signal transmitter shown in FIG. 1.

FIG. 2 shows a specific example of key arrangement on the remote control signal transmitter 332. As shown, on an operation panel of the remote control signal transmitter 332, there are provided, as keys to be used for switching among various objects of operation or control by the transmitter 332, a key 346 for selecting the AV amplifier 310, key 348 for selecting the TV set, key 350 for selecting the video tape deck and key 352 for selecting the other sound/picture source apparatus. Once an object of control is selected via any one of these keys 346, 348, 350 and 352, the remote control signal transmitter 332 functions as a controller to remote-control the selected apparatus and transmits a remote control signal for controlling the selected apparatus in response to operation of each function key. The following paragraphs describe functions of various keys (contents of instructions to the AV amplifier unit 310), assuming that the key 346 has been depressed or operated to select the AV amplifier unit 310. Power key 354 is operable for instructing ON/OFF of the main power supply within the power supply circuit 342, a surround ON/OFF key 356 for instructing ON (impartment)/OFF (non-impartment) of a surround effect by the surround circuit 320, and surround mode switching keys 358 and 360 for instructing a switch among the surround modes in forward and reverse directions. Further, sound volume keys 362 and 364 are operable for instructing a gain increase/decrease (up/down) of the electronic volume 324 to thereby adjust a sound volume, and mute button 324 for temporarily deadening or muting a generated sound. When the mute button 324 is depressed again in the sound muted state, the sound is restored to its original volume. Input switching key 368 is operable for instructing an input switch by the input switching circuit 316, and each time the input switching key 368 is depressed, a switch is effected cyclically among the sound/picture sources.

Favorite key 370 corresponding to favorite number 1, favorite key 372 corresponding to favorite number 2 and favorite key 374 corresponding to favorite number 3 are operable for transmitting storage and reproduction instructions that are essential to the present invention. Separate remote control code is allocated to each of these favorite keys 370, 372 and 374. The non-volatile RAM 340 of the AV amplifier unit 310 includes separate storage areas allocated to these favorite keys 370, 372 and 374. The remote control codes allocated to the favorite keys 370, 372 and 374 are decoded or identified by the AV amplifier unit 310, but these remote control codes of the favorite keys 370, 372 and 374 are not used to control particular parameters of the AV amplifier unit 310; namely, remote control codes that are not used to control particular parameters of the AV amplifier unit 310 are allocated to the favorite keys 370, 372. Favorite numbers 1, 2 and 3 can be allocated to any uses desired by the user; for example, the favorite numbers may be allocated to different sound/picture sources with favorite number 1 allocated to viewing a video recording (input switching set to "VCR"), favorite number 2 allocated to playing a game (input switching set to "GAME") and favorite number 3 allocated to listening to a CD (input switching set to "CD").

Keys 376, 378 and 380 are operable for the user to instruct band-by-band frequency characteristic adjustment of the graphic equalizer 322. More specifically, the key 376 is operable for instructing a change in the band to be adjusted; for example, each time the key 376 is depressed or operated, a switch is cyclically effected among 100 Hz, 350 Hz, 1 kHz, 3.5 kHz, 10 kHz, 100 Hz, 350 Hz, . . . The key 378 is for instructing a level increase (up) in the band selected by the key 376, while the key 380 is for instructing a level decrease (down) in the selected band. When such frequency characteristic adjustment is being performed, the frequency characteristic being adjusted is graphically shown on the display section 338 of the AV amplifier unit 310.

Figure 3:
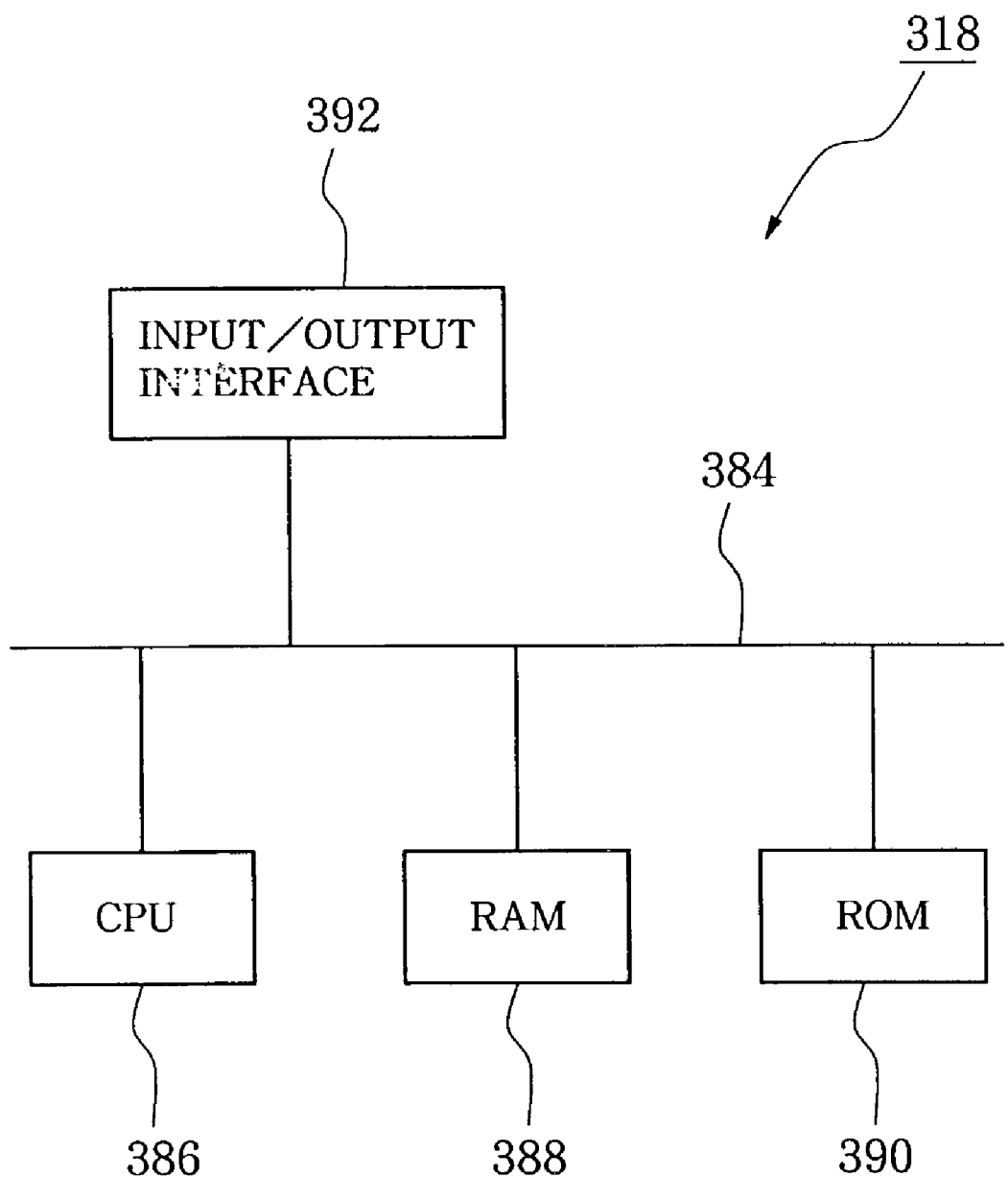
FIG. 3 is a block diagram showing an inner structure (only principal components) of a microcomputer shown in FIG. 1.

FIG. 3 is a block diagram showing an inner structure (only principal components) of the microcomputer 318 of FIG. 1. As shown, the microcomputer 318 includes a bus 384 to which are connected a CPU (Central Processing Unit) 386, RAM (volatile RAM such as an SRAM and DRAM ) (current setting retaining memory) 388, ROM 390, input/output interface 392, etc. The RAM 388 stores the current set states (i.e., settings) of the individual parameters of the AV amplifier unit 310 in a manner as illustratively shown in Table 1 above. The CPU 386 controls the parameters (input switching, surround setting, frequency characteristic setting, sound volume setting, etc.) to coincide with the values and states stored in the RAM 388. Further, in decoding or identifying the remote control code, the CPU 386 measures a length of time over which the remote control code has been continuously input. The ROM 390 has prestored therein correspondency between the remote control codes and contents of instructions indicated by the remote control codes and between operation signals of the amplifier key section 336 and contents of instructions indicated by the operation signals. Through the input/output interface 392, a light signal (remote control signal) detected by the photodetector section 334 and an operation signal generated by the amplifier key section 336 are input to the microcomputer 318, a display signal is given from the microcomputer 318 to the display section 338, respective control signals are given from the microcomputer 318 to the input switching circuit 316, surround circuit 320, graphic equalizer 322, electronic volume 324 and power supply circuit 342, data are exchanged between the non-volatile RAM 340 and the RAM 388 of the microcomputer 318, and so on.

Figure 4:
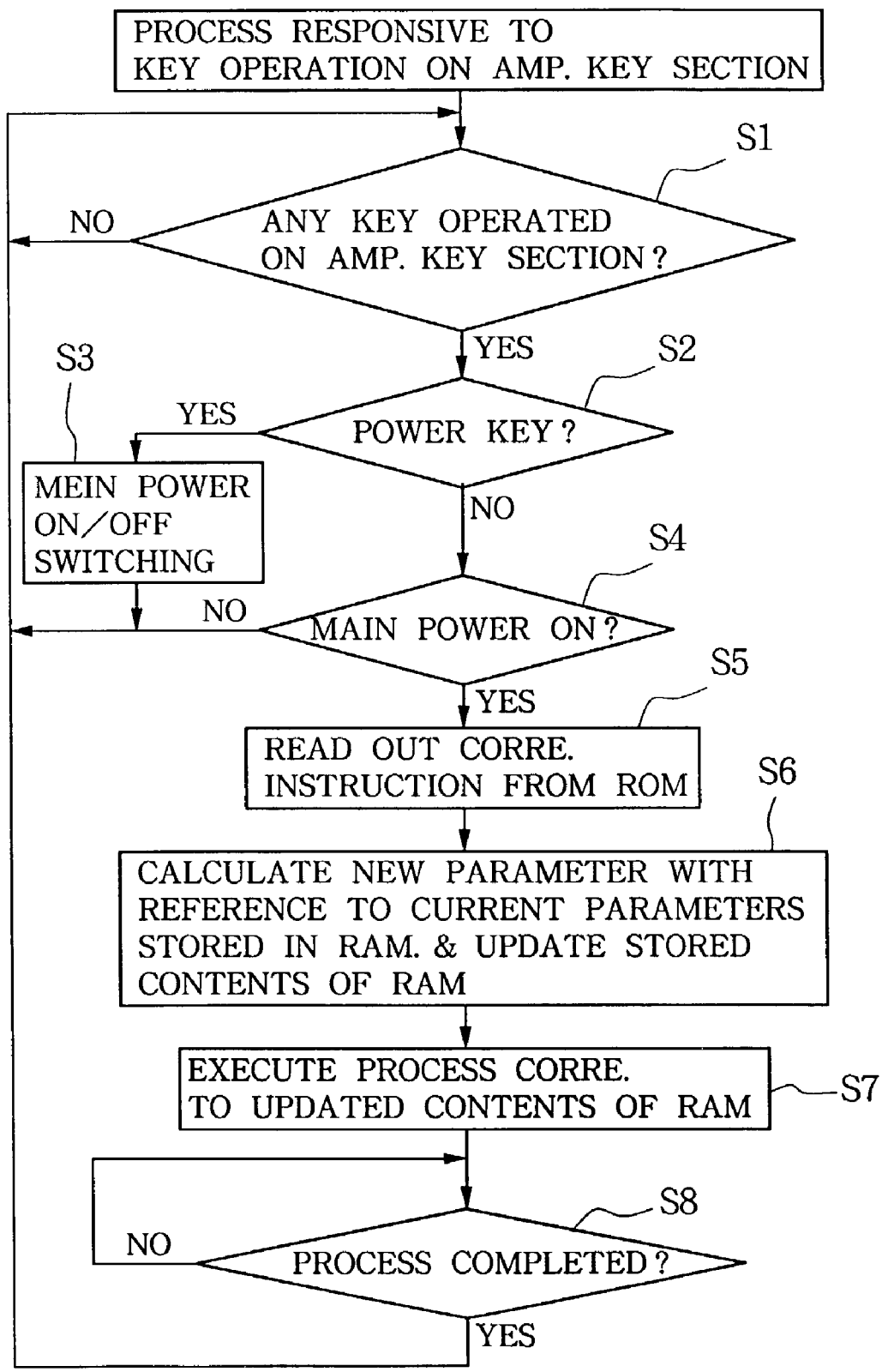
FIG. 4 is a flow chart showing control operations performed by a CPU in response to user operation of an amplifier key section shown in FIG. 1.

Now, various control performed by the CPU 386 will be described. FIG. 4 is a flow chart showing control operation of the CPU 386 responsive to user operation on the amplifier key section 336. Once any one of the keys is operated by the user on the amplifier key section 336 (step S1), a determination is made, at step S2, as to whether the operated key is the power key. With an affirmative answer at step S2, the main power supply is turned on if it has so far been in the OFF state, but turned off if it has so far been in the ON state, at step S3. If the operated key is not the power key as determined at step S2 and the main power supply has so far been in the OFF state as determined S4, the state of the main power supply is left unchanged. If the operated key is not the power key as determined at step S2 and the main power supply has so far been in the OFF state as determined S4, the CPU 386 reads out, from the ROM 390, the instruction corresponding to the key operation at step S5. Then, the CPU 386 calculates a new parameter value corresponding to the key operation, with reference to the current parameter settings stored in the RAM 388. For example, when an input switch has been instructed, the CPU 386 calculates the new parameter value by increasing or decreasing the current input source number, stored in the RAM 388, in accordance with the instruction. When a sound volume up or down has been instructed, the CPU 386 calculates the new parameter value by increasing or decreasing the current sound volume level value, stored in the RAM 388, in accordance with the instruction. Further, when a surround mode switch has been instructed, the CPU 386 calculates the new parameter value by increasing or decreasing the current surround mode number, stored in the RAM 388, in accordance with the instruction. Further, when a level up or down of one selected frequency band has been instructed, the CPU 386 calculates the new parameter value by increasing or decreasing the current level of the selected, stored in the RAM 388, in accordance with the instruction. Each time the new parameter value has been calculated in response to such user operation of one of the keys on the amplifier key section 336, the stored contents of the RAM 388 are updated with the new parameter value at step S6. Once the stored contents of the RAM 388 are updated like this, the CPU 386 carries out a process corresponding to the updated contents at step S7. Upon completion of such a process (step S8), the CPU 386 is placed in a state to wait for a next operation input at step S1. Note that even when the main power supply is turned off, the stored contents of the RAM 388 are not erased because the RAM 388 is backed up by an auxiliary power supply within the power supply circuit 342.

Figure 5:
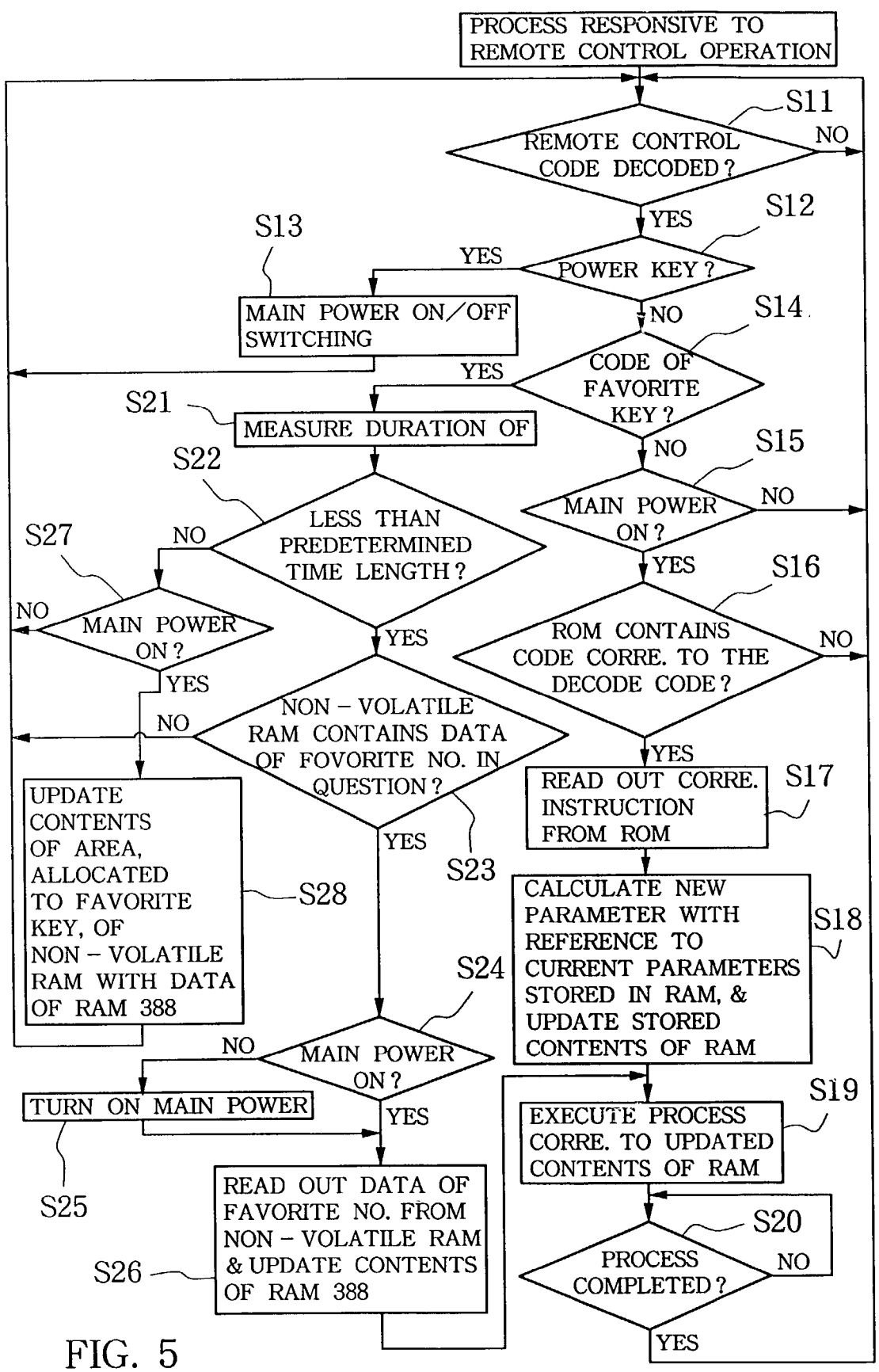
FIG. 5 is a flow chart showing control operations performed by the CPU in response to user operation on the remote control transmitter.

FIG. 5 is a flow chart showing control operation of the CPU 386 responsive to user operation on the remote control transmitter 332. The CPU 386 is constantly driven by the auxiliary power supply within the power supply circuit 342 in such a manner that it can receive the remote control signal and decode the code represented thereby even while the main power supply of the AV amplifier unit 310 is in the OFF state. Once the remote control signal has been received and the code represented thereby has been decoded at step S11, it is determined at step S12 whether the received and decoded code is the one allocated to the power key 354. With an affirmative answer at step S12, the main power supply is turned on if it has so far been in the OFF state, but turned off if it has so far been in the ON state, at step S13. In case the received and decoded code is not the one allocated to the power key 354 as determined at step S12, it is further determined at next step S14 whether the received and decoded code is the one allocated to any one of the favorite keys 370, 372 and 374. If the received and decoded code is not the one allocated to any one of the favorite keys 370, 372 and 374 as determined step S14, a further determination is made, at step S15, as to whether the main power supply is currently ON or OFF. If the main power supply is currently OFF as determined step S15, the state of the main power supply is left unchanged, and the CPU 386 reverts to a wait state of step S11. If the main power supply is currently ON, then it is determined at step S16 whether the ROM 390 contains a code corresponding to the received and decoded code. With a negative answer at step S16, the CPU 386 reverts to the wait state of step S11. If, on the other hand, the ROM 390 contains a code corresponding to the received and decoded code as determined at step S16, the CPU C386 reads out, from the ROM 390, the instruction corresponding to the received and decoded code, at step S17. Then, the CPU 386 calculates a new parameter value corresponding to the key operation, with reference to the current parameter settings stored in the RAM 388, in generally the same manner as described above in relation to the user operation on the amplifier key section 336. Namely, when an input switch has been instructed, the CPU 386 calculates the new parameter value by increasing or decreasing the current input source number, stored in the RAM 388, in accordance with the instruction. When a sound volume up or down has been instructed, the CPU 386 calculates the new parameter value by increasing or decreasing the current sound volume level value, stored in the RAM 388, in accordance with the instruction. Further, when a surround mode switch has been instructed, the CPU 386 calculates the new parameter value by increasing or decreasing the current surround mode number, stored in the RAM 388, in accordance with the instruction. Further, when a level up or down of one selected frequency band has been instructed, the CPU 386 calculates the new parameter value by increasing or decreasing the current level of the selected, stored in the RAM 388, in accordance with the instruction. Each time the new parameter value has been calculated in response to user operation of one of the keys on the remote control signal transmitter 332, the stored contents of the RAM 388 are updated with the new parameter value at step S18. Once the stored contents of the RAM 388 are updated like this, the CPU 386 carries out a process corresponding to the updated contents at step S17. Upon completion of such a process (step S20), the CPU 386 is placed in the state to wait for a next operation input at step S11.

If the received and decoded code is the one allocated to any one of the favorite keys 370, 372 and 374 as determined at step S14, the CPU 386 measures a length of time over which the code has been continuously input, at step S21. If the measured length of time is less than a predetermined time length (e.g., three sec.) as determined at step S22 and no data is currently stored in the storage area, allocated to the code, of the non-volatile RAM 340 as determined at step S23, the CPU 386 reverts to the wait state of step S11. If, on the other hand, data is currently stored in the storage area, allocated to the code, of the non-volatile RAM 340 as determined at step S23, a determination is made, at step S24, as to whether or not the main power supply is currently in the ON state. If the main power supply is currently in the OFF state as determined at step S24, the CPU 386 goes to step S25 in order to turn on the main power supply. Then, at step S26, the CPU 386 reads out the data in question from the non-volatile RAM 340 and updates the RAM 388 with the read-out data. After that, the CPU 386 carries out a process in accordance with the updated contents, at step S19. In this way, previously-made settings corresponding to the designated favorite number are reproduced. Upon completion of such a process (step S20), the CPU 386 is placed in the state to wait for a next operation input at step S11.

Once the time length measured at step S21 has reached or exceeded the predetermined time length, a determination is made, at step S27, as to whether or not the main power supply is currently in the ON state. If the main power supply is currently in the OFF state as determined at step S27, the CPU 386 reverts to the wait state of step S11. If, on the other hand, the main power supply is currently in the ON state, then the stored contents of the storage area, allocated to the operated favorite key, of the non-volatile RAM 340 are updated with the current stored contents of (i.e., current settings stored in) the RAM 388 at step S28. In this way, the newly-set contents (new setting) of the favorite are stored in corresponding relation to the favorite number. Once the storage of the newly-set contents of the favorite has been completed, a message to that effect is displayed on the display section 338. After that, the CPU 386 is placed in the state to wait for a next operation input at step S11.

Whereas the above-described embodiment employs the non-volatile RAM 340, the non-volatile RAM 340 may be replaced with a volatile RAM backed up by a cell or other suitable power source. Further, while the embodiment has been described as having favorite keys only on the remote control transmitter, such favorite keys may also be provided on the body of the electronic apparatus (AV amplifier unit) so that favorite contents can be stored and reproduced via either one of the remote control transmitter and body of the electronic apparatus. Furthermore, while the embodiment has been described in relation to the case where the present invention is applied to remote control of audio apparatus, the present invention may also be applied to other types of electronic apparatus. Furthermore, although the control section comprises only the microcomputer 18 in the above-described embodiment, some of the functions of the control section, i.e. decoding of the contents of a remote control signal, measurement of the length of time over which a predetermined remote control signal has been continuously input and control of the other components, may be implemented by circuit components other than the microcomputer. In such a case, a combination of the microcomputer and other circuit components constitutes the control section.

Now, a description will be made about an audio system in accordance with the present invention, which employs the novel remote control technique of the invention.

Figure 6:
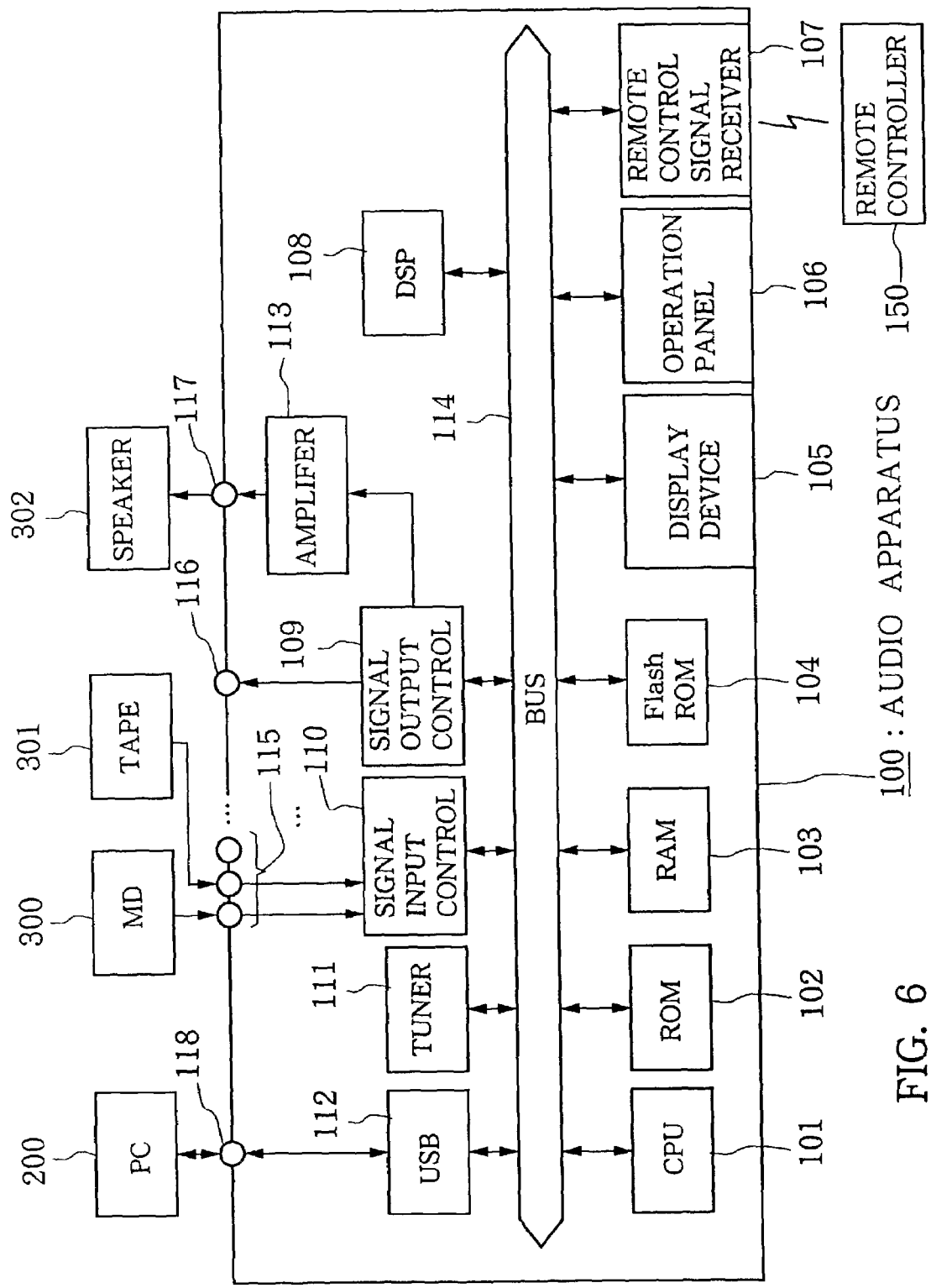
FIG. 6 is a block diagram showing an exemplary general setup of an audio apparatus employed in an audio system in accordance with an embodiment of the present invention.

A. General Setup of Audio System:

FIG. 6 is a block diagram showing an exemplary general setup of an audio system employing a remote control apparatus in accordance with the present invention. As shown, this audio system 1 includes an audio apparatus 100 and a personal computer (PC) 200.

A-1. Construction of the Audio Apparatus:

The audio apparatus 100 includes a CPU (Central Processing Unit) 101, a ROM (Read-Only Memory) 102, a RAM (Random Access memory) 103, a flash ROM 104, a display device 105, an operational panel 106, a remote control signal reception section 107, a DSP (Digital Signal Processing) section 108, a signal output control section 109, a signal input control section 110, a tuner 111, and a USB (Universal Serial Bus) interface 112.

To the signal input control section 110 are input digital or analog audio signals via any one of external-apparatus connecting terminals 115 provided on the backside of the audio apparatus 100. The signal input control section 110 is controlled by the CPU 101 in accordance with an operated state of the operational panel 106 or instruction given from the personal computer (PC) 200, so that the control section 110 selects any one of the external-apparatus connecting terminals 115 to introduce the audio signals through the selected connecting terminals 115 into the audio apparatus 100. Each of the signals thus introduced into the audio apparatus 100 is supplied to the CPU 101. Although not specifically shown, the signal input control section 110 includes an A/D converter circuit which, when an analog audio signal is input, converts the input signal into a digital audio signal.

As shown, various external audio apparatus, such as a MD (Mini Disk) player 300 and cassette tape deck 301, can be connected to the external-apparatus connecting terminals 115. Digital and analog audio signals from the audio reproduction apparatus, such as the MD player 300 and cassette tape deck 301, can be supplied to the signal input control section 110 via the corresponding external-apparatus connecting terminals 115.

The tuner 111 tunes in to a user-selected broadcast wave and receives the broadcast wave to demodulate the received broadcast wave. Received signal data obtained by the demodulation is supplied to the CPU 101.

The signal output control section 109 outputs, to an amplifier 113 or output terminal 116, the audio signal having been introduced via the signal input control section 110 or tuner 111 into the audio apparatus 100 and then subjected to various signal processing performed by the DSP 108 and the like. The amplifier 113 amplifies the audio signal supplied from the signal output control section 109 and passes the amplified audio signal to a speaker 302 connected to a speaker terminal 117. As a consequence, the speaker 302 audibly produces a sound corresponding to the audio signal output from the signal output control section 109. Audio recording apparatus, such as a MD (Mini Disk) recording apparatus or cassette tape deck, can be connected to the output terminal 116. By thus connecting the audio recording apparatus to the output terminal 116, the audio signal output from the signal output control section 109 can be recorded onto a recording medium such as a MD or cassette tape.

The DSP section 108 is controlled by the CPU 101 in accordance with a current operated state of the operational panel 106 or instruction given from the personal computer 200, so as to perform various digital signal processing, such as sound field control and stereophonic sound effect imparting processes, on the audio signal passed from the signal input control section 110. The DSP section 108 delivers the thus-processed audio signal to the signal output control section 109.

Various operation keys are provided on the operation panel 106 of the audio apparatus 100, and each time the user operates any of the operation keys, the operation panel 106 supplies the CPU 101 with a command signal corresponding to the operated key.

The display device 105 visually displays various information, such as information indicative of a currently-selected sound source, i.e. from which external audio apparatus connected to any one of the external-apparatus connecting terminals 115 audio signals are being input and information indicative of contents of signal processing currently carried out by the DSP section 108.

The remote control signal reception section 107 is an accessory for the audio apparatus 100, and it receives a control command transmitted wirelessly from a remote control signal transmitter (remote controller) 150 for remote-controlling the audio apparatus 100. The remote control signal reception section 107 supplies the received control command to the CPU 101.

The USB interface 112 interfaces between the audio apparatus 100 and the personal computer 200 connected via a USB connecting terminal 118 with the audio apparatus 100.

The CPU 101 controls overall behavior of the audio apparatus 100. In the ROM 102, there are stored various programs for execution by DSP programs and DSP data for use by the DSP section 108, as well as various other control programs and control data. Also, the ROM 102 has prestored therein a program that allows the audio apparatus 100 to be controlled via the personal computer 200 connected with the audio apparatus 100. The CPU 101 carries out various control processes by reading out the various control programs and control data from the ROM 102. Further, the DSP section 108 reads out the DSP programs and DSP data from the ROM 102 to carry out various signal processing on the audio signal.

The RAM 103 temporarily stores various data to function as a working area, and also includes an area storing an allocation information table defining correspondency between a plurality of control commands sent from the remote control signal transmitter 150 and specific contents of control processes allocated to the control commands. Backup power supply (not shown) is connected to the RAM 103, so as to prevent data stored in the RAM 103 from being lost even when no power is supplied to the audio apparatus 100.

The RAM 103 also stores therein various settings (set values and states) of the audio apparatus 100 having been made in accordance with an operated state of the operational panel 106 or instruction given from the personal computer 200; examples of such parameter settings include a sound volume parameter value, information indicating from which external audio apparatus connected to any one of the external-apparatus connecting terminals 115 audio signals are being currently input, and information indicating what kind of signal processing should be performed. Thus, once the audio apparatus 100 is turned on again after having been turned off, the CPU 101 reads out the various settings stored in the RAM 103 so that the audio apparatus 100 carries out control operations corresponding to the thus read-out settings. Namely, the RAM 103 can retain the states of the audio apparatus 100 at the time of the turning-off of the power, and thus once the power to the audio apparatus 100 is turned on again, the audio apparatus 100 can be restored to just the same states as before the power-off. Details of the allocation information table stored in the RAM 103 will be described later.

In the flash ROM 104, there is rewritably stored a firmware program taking charge of the basic behavior of the audio apparatus 100.

Figure 7:
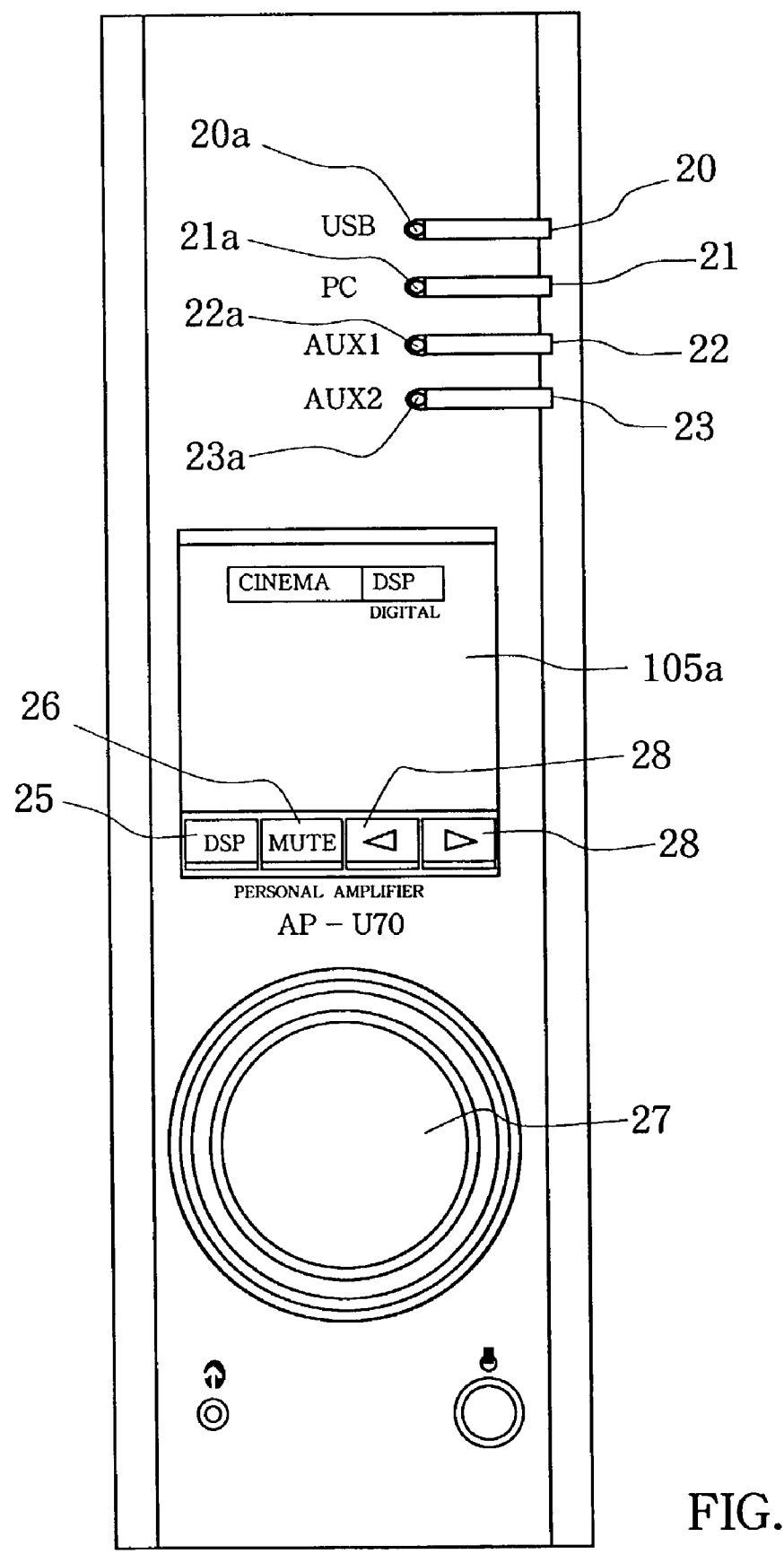
FIG. 7 is an external view of a front panel of the audio apparatus shown in FIG. 6.

The following paragraphs describe an external appearance of the audio apparatus 100. FIG. 7 is an external view of a front panel of the audio apparatus 100. As shown, a plurality of operators of the operation panel 106 of FIG. 6 are provided on the front panel of the audio apparatus 100. Specifically, on the front panel of the audio apparatus 100, there are provided sound-source selecting operators 20–23, a DSP operator 25, a muting (MUTE) operator 26, a volume operator 27 and up/down operators 28.

The sound-source selecting operators 20–23 are provided for the user to select any desired one of a plurality of input sound sources. The DSP operator 25 is provided for the user to give an instruction as to whether or not the DSP section 108 should be caused to operate, i.e. whether or not digital signal processing should be performed by the DSP section 108. The muting (MUTE) operator 26 is for the user to give an instruction as to whether or not the audio apparatus 100 should be placed in a mode for not outputting an audible sound. The up/down operators 28 are for the user to select any desired one of many kinds of DSP modes when the DSP operator 25 has been turned on. The volume operator 27 is for the user to set a sound volume parameter value of a tone signal to be output from the audio apparatus 100.

Further, a visual display section 105a constituting the display device 105 of FIG. 6 is provided on the front panel of the audio apparatus 100. The display section 105a, which is, for example, in the form of a fluorescent display tube or liquid crystal display (LCD), visually displays various information such as a currently-selected DSP mode. Also, on the front panel of the audio apparatus 100, there are provided indicators 20a–23a in corresponding relation to the sound-source selecting operators 20–23 for indicating selection states of the corresponding selecting operators 20–23; the indicators 20a–23a are turned on (i.e., illuminated) or turned off in accordance with the respective operated states of the corresponding selecting operators 20–23.

Figure 8:
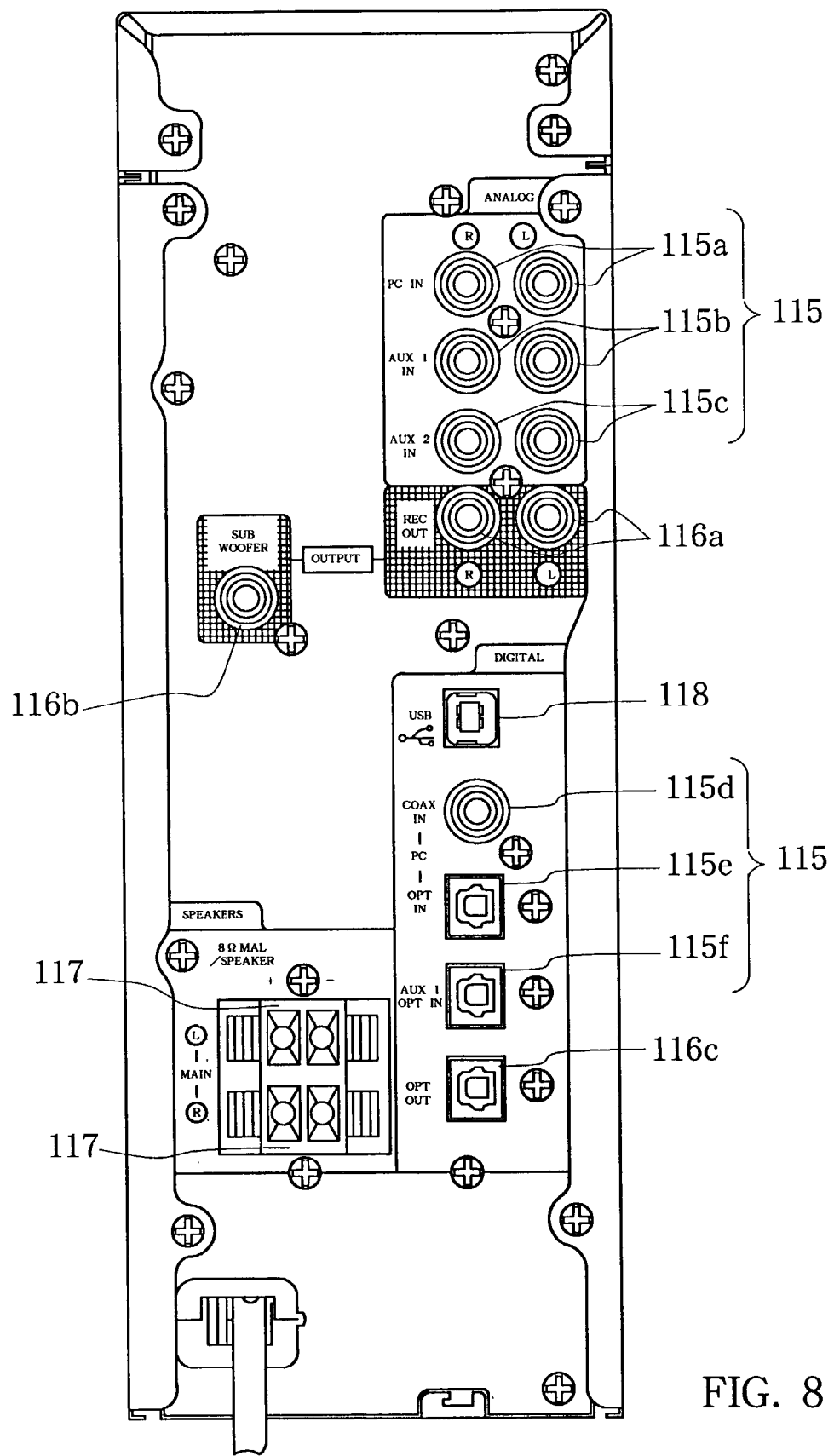
FIG. 8 is an external view of a rear panel of the audio apparatus shown in FIG. 6.

FIG. 8 is an external view of a rear panel of the audio apparatus 100, on which are provided the above-mentioned external-apparatus connecting terminals 115, output terminals 116, speaker terminals 117 and USB terminal 118 shown in FIG. 6. In the instant embodiment, the external-apparatus connecting terminals 115 on the rear panel of the audio apparatus 100 comprise analog input terminals 115a, 115b and 115c each for inputting an analog signal and digital input terminals 115d, 115e and 115f each for inputting a digital signal. The output terminals 116 comprise analog output terminals 116a each for outputting an analog signal, an analog output terminal 116b for outputting an analog signal to a sub-woofer, and a digital output signal 116c for outputting a digital signal.

Figure 9:
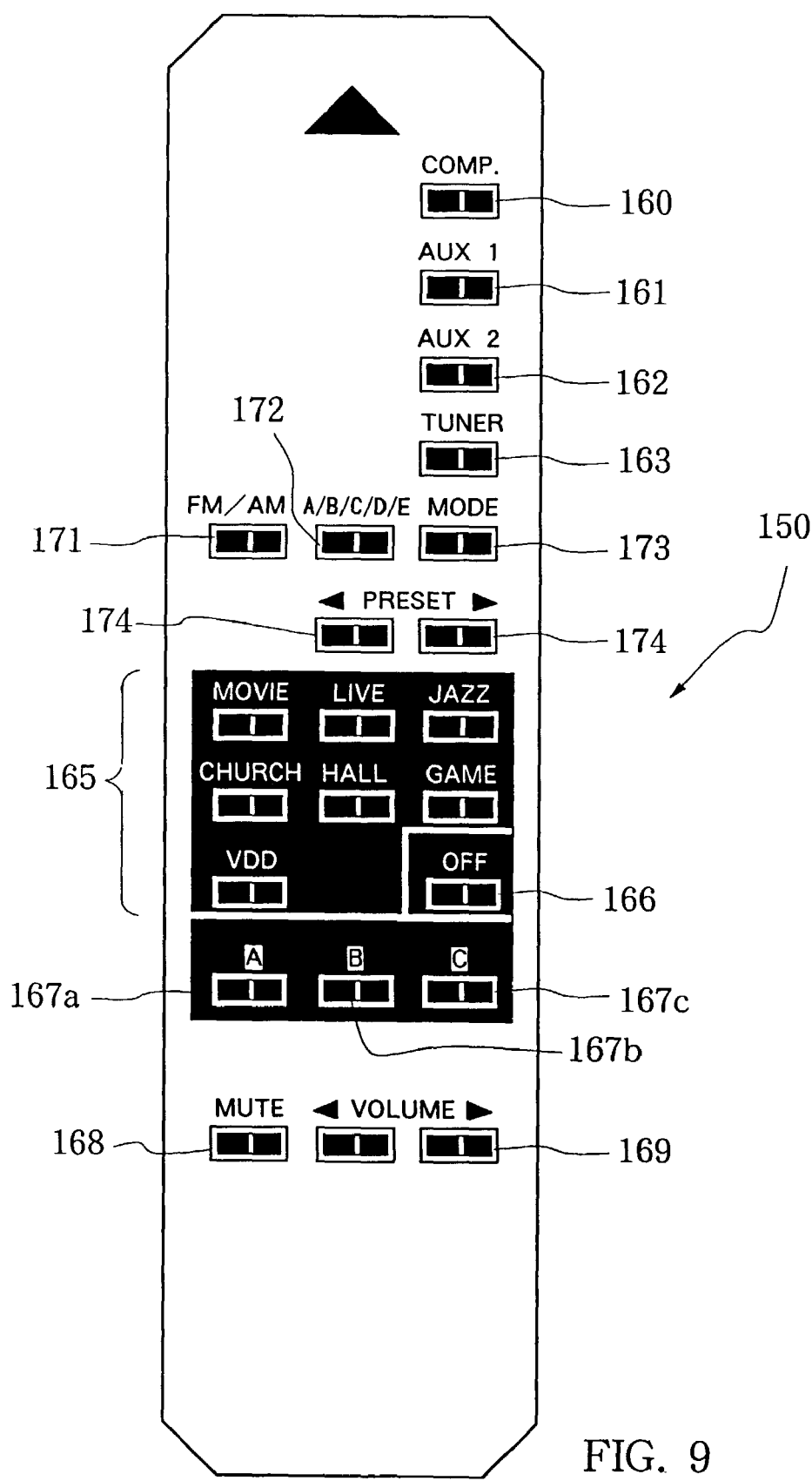
FIG. 9 is an external view of a front panel of a remote control signal transmitter for remote-controlling the audio apparatus.

A-2. Remote Control Signal Transmitter:

Next, a description will be made about the remote control signal transmitter (remote controller) 150 for remote-controlling the audio apparatus 100, with reference to FIG. 9. As shown in FIG. 9, the remote control signal transmitter 150 includes a plurality of operation buttons provided on its front panel. More specifically, on the front panel of the remote control signal transmitter 150, there are provided sound-source selecting buttons 160–163, FM/AM switching buttons 171, station selecting buttons 172, mode selecting buttons 173, preset up/down buttons 174, DSP-mode designating buttons 165, power-off button 166, customizing buttons 167*a*, 167*b* and 167*c,* muting (MUTE) button 168, and volume up/down buttons 169.

The sound-source selecting buttons 160–163 are provided for the user to select any desired one of a plurality of sound sources, similarly to the sound-source selecting operators 20–23 provided on the front panel of the audio apparatus 100. The FM/AM switching buttons 171 are provided for the user to set which of FM (Frequency Modulated) and AM (Amplitude Modulated) waves should be received via the tuner 111. The station selecting buttons 172 are for the user to select a desired one of a plurality of preset broadcast wave channels, and the tuner 111 is caused to tune in to the broadcast wave channel selected by the user operation of one of the station selecting button 172. The mode selecting buttons 173 are for the user to select any desired one of various modes of the audio apparatus 100. The preset up/down buttons 174 are for the user to select a desired one of the preset broadcast wave channels to which the tuner 111 should be caused to tune in. The DSP-mode designating buttons 165 are for the user to set desired contents of digital signal processing to be performed, by the DSP section 108 of the audio apparatus 100, on the audio signal. In the illustrated example, there are provided the DSP-mode designating buttons 165 labeled "MOVIE", "LIVE", "JAZZ", "CHURCH", "HALL", "GAME" and "VDD". The user can select desired contents of the DSP (Digital Signal Processing) by selectively operating a corresponding one of the DSP-mode designating buttons 165. The power-off button 166 is provided for the user to give an instruction for turning off the power. The customizing buttons 167*a*, 167*b* and 167*c* are buttons to which the user can allocate desired functions; in the illustrated example, three customizing buttons 167*a*, 167*b* and 167*c* are provided. The muting buttons 168 are for the user to give an instruction as to whether or not the audio apparatus 100 should be placed in the mode for not outputting an audible tone, similarly to the muting operator 26 provided on the front panel of the audio apparatus 100. The volume up/down buttons 169 are for the user to set a desired sound volume parameter value of the tone signal to be output from the audio apparatus 100, similarly to the volume operator 27 provided on the front panel of the audio apparatus 100.

Once one of the buttons on the front panel of the remote control signal transmitter 150 is depressed or operated by the user, the remote control signal transmitter 150 transmits wirelessly a control command corresponding to the depressed or operated button. Namely, in a not-shown memory of the remote control signal transmitter 150, there is stored, for each of the buttons, information indicative of a control command to be transmitted. Thus, the remote control signal transmitter 150 selects the control command corresponding to the operated button by referring to the command-indicating information stored in the not-shown memory and then wirelessly transmits the selected control command to the audio apparatus 100.

A-3. Allocation Information Table:

When the remote control signal transmitter 150 transmits wirelessly the control command corresponding to the user-operated button, the remote control signal reception section 107 of the audio apparatus 100 receives the wirelessly-transmitted control command, in response to which the audio apparatus 100 performs the function allocated to the received control command, i.e. the function corresponding to the user-operated button. To carry out a control process for performing the function, the CPU 101 of the audio apparatus 100 refers to the allocation information table stored in the RAM 103.

FIG. 10 is a diagram showing exemplary contents of the allocation information table stored in the RAM 103. As shown, the allocation information table includes a fixed allocation information table as shown in FIG. 10A and a customized allocation information table as shown in FIG. 10B. The fixed allocation information table contains information indicative of a function to be performed in accordance with a control command transmitted in response to depression or operation of any one of the buttons of the remote control signal transmitter 150 other than the customizing buttons 167*a*, 167*b* and 167*c*. Namely, in the fixed allocation information table, there is registered such allocation information as to perform the functions having been described above in relation to the respective buttons of the remote control signal transmitter 150 other than the customizing buttons 167*a*, 167*b* and 167*c*. For example, if the control command transmitted in response to user operation of the FM/AM switching button 171 is "control command A", contents of control, i.e. FM/AM switching process, for switching the broadcast wave to be received via the tuner 111 is described in a "function" area of the fixed allocation information table that is associated with control command A. Thus, when the user has depressed or operated the FM/AM switching button 171 of the remote control signal transmitter 150, control command A is transmitted from the remote control signal transmitter 150 to the audio apparatus 100. Then, the audio apparatus 100, having received control command A, makes reference to the fixed allocation information table to see that the control commands instructs execution of the FM/AM switching process, as a result of which the FM/AM switching process is carried out in the audio apparatus 100 for switching the broadcast wave to be received via the tuner 111.

The customized allocation information table includes areas for storing information indicative of functions or control to be performed in accordance with control commands C1, C2 and C3 transmitted in response to depression or operation of the respective customizing buttons 167*a*, 167*b* and 167*c* of the remote control signal transmitter 150. In an initial stage, the above-mentioned areas are empty so that information indicative of user-desired functions can be registered freely in the areas through a customized function setting process carried out by the audio apparatus 100 and personal computer 200 as will be later described.

More specifically, the customized allocation information table of FIG. 10B includes areas for storing items, such as "operation flag", "function 1", "function 2", "function 3", . . . , "function N" for each of command C1, command C2 and command C3. Any one of three flag values "0", "1" and "2" can be stored in the "operation flag" area for each of commands C1–C3. Here, operation flag value "0" indicates that given functions to be performed by the audio apparatus 100 have been allocated to the control command in question. Namely, when the control command, for which operation flag value "0" is set, has been received, the CPU 101 carries out a control process for performing the functions as specified in the "function 1" area, "function 2" area, . . . , "function N" area. Operation flag value "1" indicates that no function whatsoever has been allocated to the control command in question. Namely, when the control command, for which operation flag value "1" is set, has been received, the CPU 101 carries out no control in response to this received command. Further, operation flag value "2" indicates that the control command in question is to be transferred to the personal computer 200. Namely, when the control command, for which operation flag value "2" is set, has been received, the CPU 101 transmits this received control command to the personal computer 200 via the USB interface 112 and USB connecting terminal 118.

Namely, in the customized allocation information table of FIG. 10B, up to a maximum of N functions, e.g. "function 1", "function 2", "function 3", . . . , "function N", can be allocated to each of the control commands. In other words, the instant embodiment permits customization (custom function setting) such that user depression or operation of just one of the customizing buttons on the remote control signal transmitter 150 can cause a plurality of functions to be performed concurrently or in a collective fashion. Further, sub-areas "flag" and "set value" are provided for each of "function 1", "function 2", "function 3", . . . , "function N" areas. In the "flag" sub-area, any one of flag values "0" and "1" is stored. Here, flag value "0" in the "flag" sub-area indicates that a control process is to be carried out for performing a function designated by a value specified in the "set value" sub-area, and flag value "1" in the "flag" sub-area indicates that no control process whatsoever is to be carried out as regards the function in question. In the "set value" sub-area, numerical value information is stored for specifying a plurality of functions capable of being allocated as the function in question. Details of functions capable of being allocated as "function 1", "function 2", "function 3", . . . , "function N" in the instant embodiment will be described later.

Figure 11:
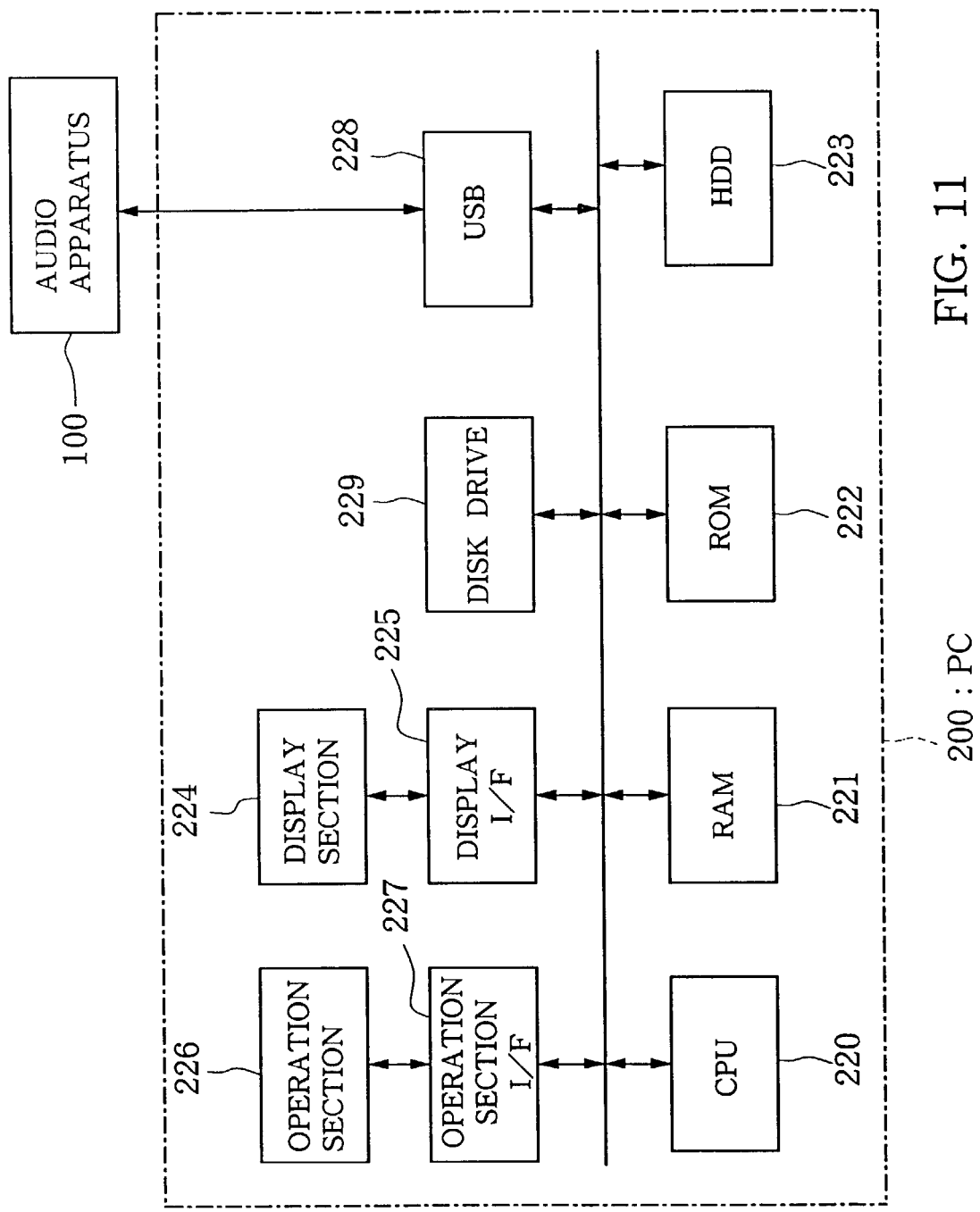
FIG. 11 is a block diagram showing exemplary construction of a personal computer connected with the audio apparatus.

A-4. Construction of the Personal Computer:

The following paragraphs describe an exemplary construction of the personal computer 200 connected with the above-described audio apparatus 100, with reference to FIG. 11. As shown, the personal computer 200 includes a CPU 220, a RAM 221, a ROM 222, a hard disk 223, a visual display section 224, a display interface 225, an operation section 226, an operation section interface 227, a USB interface 228, and a disk drive device 229.

The CPU 220 executes various arithmetic operations and controls the various components of the personal computer 200. The RAM 221 is used as a working memory for the CPU 220 to temporarily store various data. The ROM 222 has prestored therein programs to be read out and executed by the CPU 220. The display section 224, which is, for example, in the form of a liquid crystal display (LCD) or Cathode Ray Tube (CRT), visually displays pictures to the user. The display interface 225 is an interface that causes the display section 224 to display pictures corresponding to data supplied from the CPU 220. The operation section 226 is, for example, in the form of a keyboard, mouse, etc. that are used by the user to enter instructions. The operation section interface 227 is an interface through which data indicative of the instruction entered via the operation section 226 is supplied to the CPU 220. The USB interface 228 interfaces the personal computer 200 and the audio apparatus 100 connected with the personal computer 200 via a not-shown USB connecting terminal The disk drive device 129 reads out data recorded on a recording medium, such as a floppy disk or CD-ROM (Compact Disk-Read Only Memory). The hard disk 223 stores programs including an operating system and various application software that are read out and executed by the CPU 220.

In the instant embodiment, the hard disk 223 has stored therein audio-apparatus controlling application software for controlling various settings of the audio apparatus 100 via the personal computer 200; that is, the personal computer 200 can control the audio apparatus 100 using the audio-apparatus controlling application software. For example, a screen showing various detailed settings (set states) of the audio apparatus 100 can be visually displayed on the display section 224, so that the user is allowed to make desired detailed settings of the audio apparatus 100 (e.g., selection of digital signal processing to be carried out by the DSP section 108 and various detailed settings for the selected digital signal processing) by manipulating the operation section 226, including the keyboard, mouse, etc., while referring to the displayed screen of the display section 224.

Further, by the CPU 220 executing the above-mentioned audio-apparatus controlling application software, the user can set functions to be allocated to the customizing buttons 167a, 167b and 167c of the remote control signal transmitter 150, using the personal computer 200. Namely, using the personal computer 200, the user of the audio apparatus 100 is allowed to modify or rewrite the settings of the customized allocation information table (see FIG. 10) stored in the RAM 103 of the audio apparatus 100. This customized function setting process can also be arranged in such a manner that in response to user operation of any one of the customizing buttons 167a, 167b and 167c, setting process can control the audio-apparatus controlling application software being executed by the CPU 220 of the personal computer 200 rather than the audio apparatus 100 itself.

B. Behavior of the Audio System:

In the audio system 1 including the interconnected audio apparatus 100 and personal computer 200, as described above, the customized setting of functions to be allocated to the customizing buttons 167a, 167b and 167c of the remote control signal transmitter 150, which is provided for remote-controlling the audio apparatus 100, can be performed using the personal computer 200.

Further, in the audio system 1 of the invention, the personal computer 200 connected with the audio apparatus 100 can be remote-controlled by the user manipulating the remote control signal transmitter 150, on the basis of the contents of the customized function setting. The following will describe behavior of the audio system 1 focusing primarily on its operations when the customized function setting process is performed and when the personal computer 200 is remote-controlled.

B-1. Behavior in the Customized Function Setting Process:

First, the behavior of the audio system 1 in the customized function setting process will be described. The customized function setting process is carried out in the audio system 1 by the personal computer 200 transmitting, to the audio apparatus 100, setting information indicative of customized contents having been set by the user so that audio apparatus 100 rewrites the contents of the customized allocation information table in the RAM 103 on the basis of the setting information received from the personal computer 200.

Figure 12:
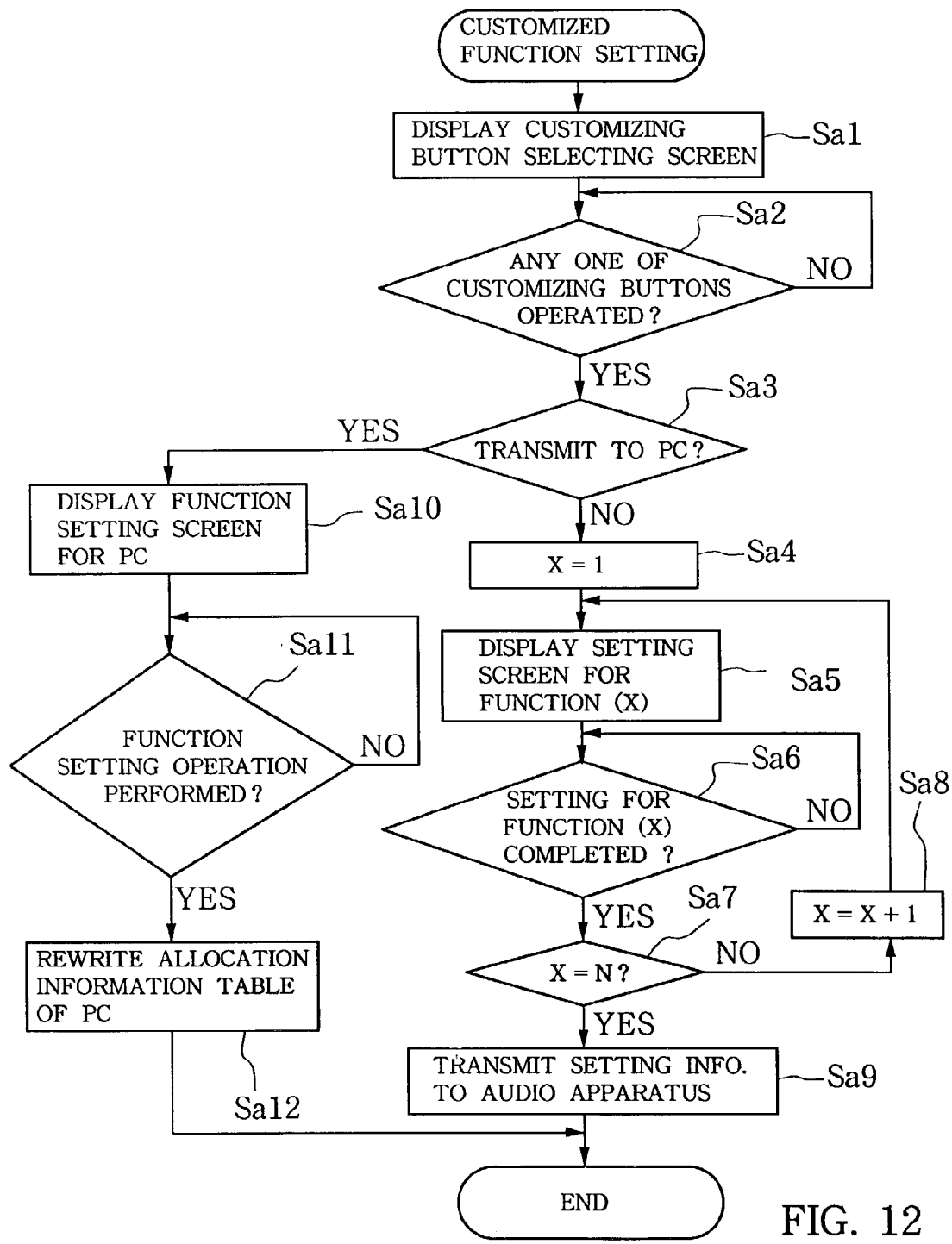
FIG. 12 is a flow chart of a routine performed by the personal computer for setting functions to be allocated a customizing button of the remote control signal transmitter.

B-1-1. Operation of the Personal Computer:

The following paragraphs describe operation of the personal computer 200 in the customized function setting process. FIG. 12 is a flow chart of a routine performed by the CPU 220 of the personal computer 200 in the customized function setting process. As shown, when the user has operated the operation section 226 as appropriate for customized function setting any one of the customizing buttons 167a, 167b and 167c, a control signal corresponding to the user operation is sent via the operation section interface 227 to the CPU 220, which in turn initiates a process for the customized function setting.

Figure 13:
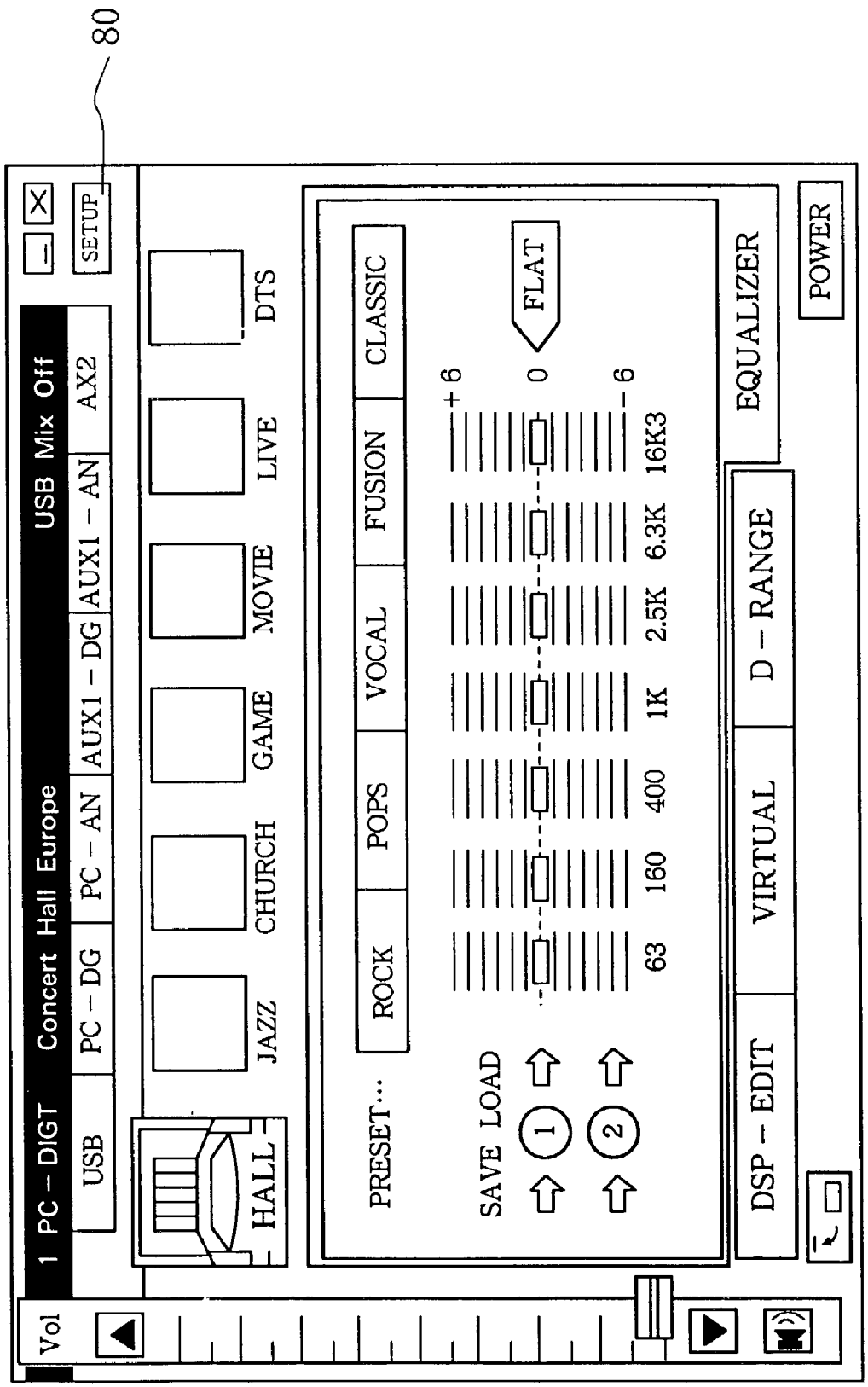
FIG. 13 is a diagram showing a screen displayed via application software for controlling the audio apparatus which is executed by the personal computer.
Figure 14:
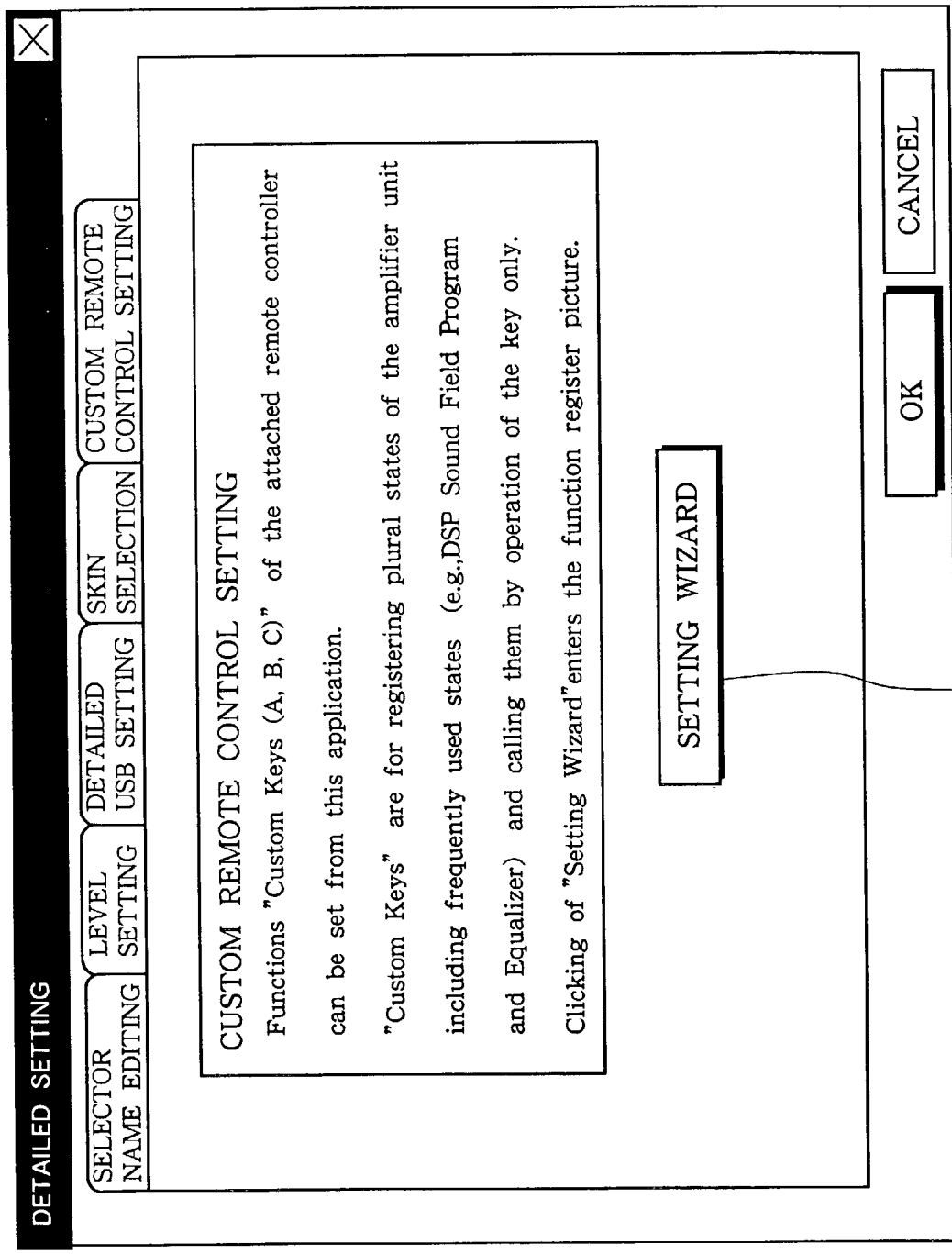
FIG. 14 is a diagram showing a screen displayed on a display section of the personal computer when functions to be allocated to the customizing button are to be set.

In the instant embodiment, the customized function setting process is carried out by the CPU 220 running a specific one of routines contained in the above-mentioned audio-apparatus controlling application software, and this customized function setting routine is executed by the CPU 220 in accordance with the following procedures. With the audio-apparatus controlling application software, as noted above, the personal computer 200 can make detailed settings such as settings for the digital signal processing to be performed in the audio apparatus 100. For that purpose, a detailed setting screen is displayed on the display section 224, as shown in FIG. 13. The detailed setting screen functions not only as a GUI for detailed setting related to the digital signal processing to be performed in the audio apparatus 100, but also as a current-setting checking screen. Once the user clicks a "SETUP" button 80 on an upper right portion of the screen, a detailed setting screen as illustrated in FIG. 14 shows up on the display section 224. When the user clicks a "SETTING WIZARD" button 90 on the detailed setting screen, the CPU 220 starts up the customized function setting routine.

Figure 15:
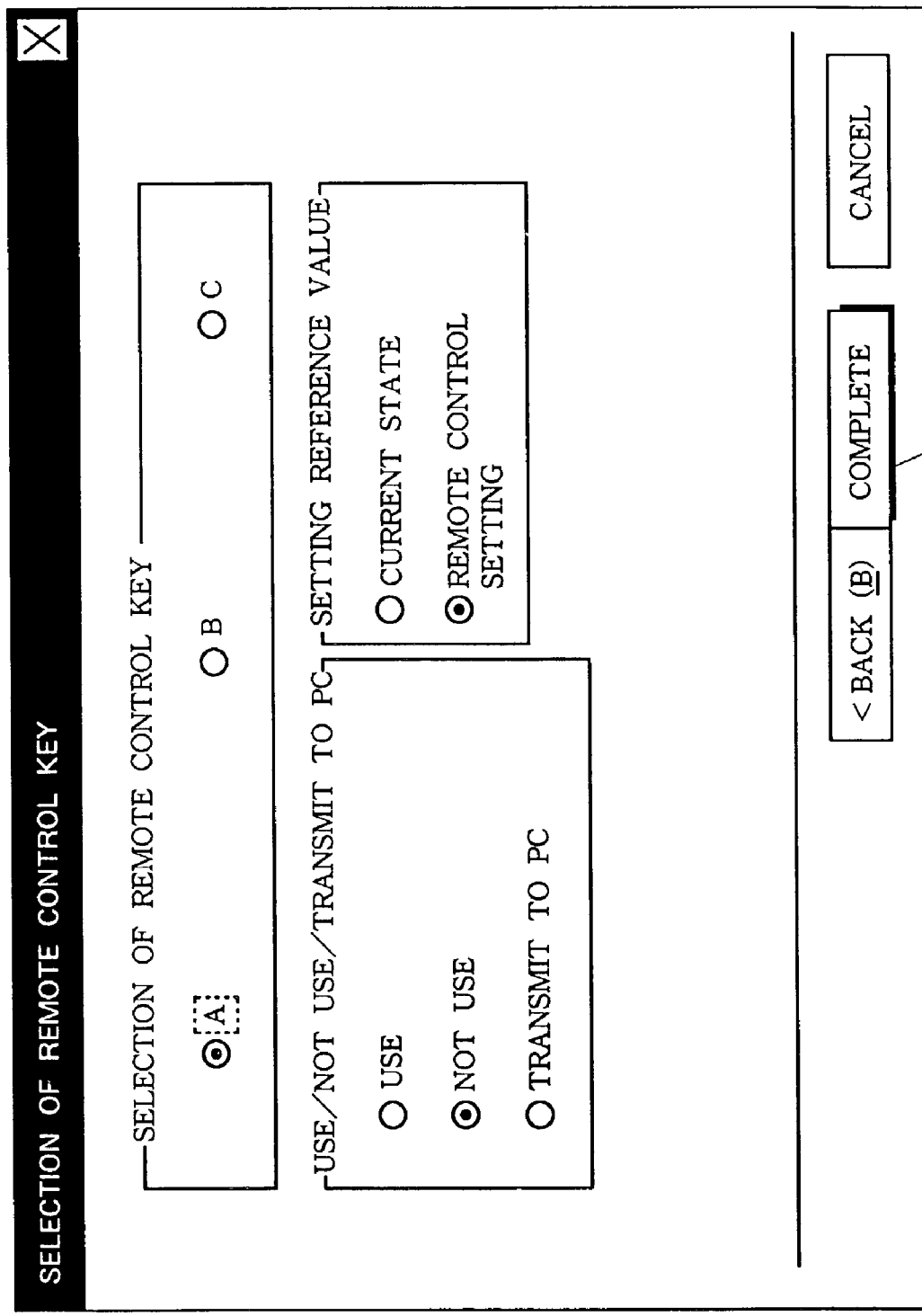
FIG. 15 is a diagram showing another screen displayed on the display section of the personal computer when functions to be allocated to the customizing button are to be set.

Namely, once the "SETTING WIZARD" button 90 is clicked after the procedures as noted above, the CPU 220 starts up the customized function setting routine and causes a customizing button selecting screen to be displayed on the display section 224 as illustratively shown in FIG. 15, so as to prompt the user to select any one of the buttons whose function is to be customized (step Sa1). In FIG. 15, key "A" represents the customizing button 167a, key "B" represents the customizing button 167b, and key "C" represents the customizing button 167c.

In addition to prompting the user to select the customizing button, the customizing button selecting screen allows the user to instruct how to treat the selected button, i.e. select any one of three options, "use", "not use" and "transmit to PC". Here, the "use" option means that a customized function is to be assigned to the selected button and the assigned customized function is used. If the "use" option is selected, flag value "0" is written into the "operation flag" area of the customized allocation information table (FIG. 10B) in a customized-allocation-information-table rewriting process to be later described. If the "not use" option is selected, flag value "1" is written into the "operation flag" area of the customized allocation information table. Further, if the "transmit to PC" option is selected, flag value "2" is written into the "operation flag" area of the customized allocation information table.

In the above-mentioned manner, the user can decide each button whose function is to be customized and the like, by manipulating the mouse and the like of the operation section 226 using the customizing button selecting screen.

After having caused the above-mentioned customizing button selecting screen to be displayed on the display section 224, the CPU 220 shifts to a state for awaiting a button selection by the user, and then determines, at step Sa2, whether or not any operation has been performed by the user for selecting one of the customizing buttons and the like. If the user has performed such operation for selecting one of the customizing buttons and the like, i.e. if the user has clicked a "COMPLETE" button 95 on the screen of FIG. 15, as determined at step Sa2, the CPU 220 makes a determination, at step Sa3, as to whether or not the "transmit to PC" option has been selected.

If the "transmit to PC" option has not been selected, i.e. if the "use" or "not use" option has been selected by the user, as determined at step Sa3, and when the "COMPLETE" button 95 has been clicked, the CPU 220, at step Sa5, sets, to a value "1", a function variable X indicative of the number of a function to be allocated to the selected button; the function number correspond to the numerical value added to the end of one of the functions shown in FIG. 10 (e.g., numerical value "1" as in "function 1"). Then, at step Sa5, the CPU 220 causes the display section 224 to display a screen for setting the function corresponding to the current value of the function variable X (in this case, "function 1" because the value of the function variable X is "1").

Figure 16:
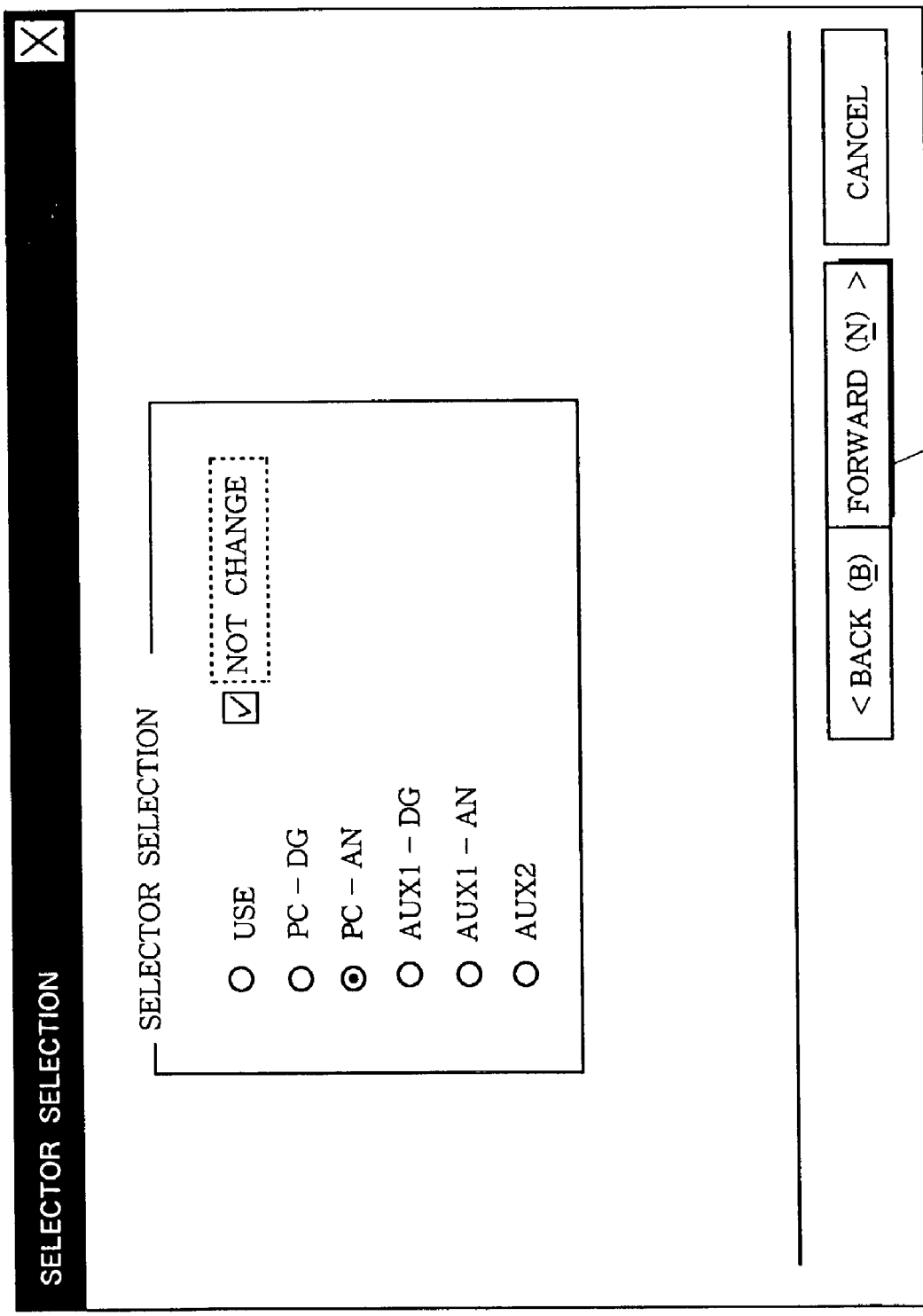
FIG. 16 is a diagram showing another screen displayed on the display section of the personal computer when functions to be allocated to the customizing button are to be set.
Figure 17:
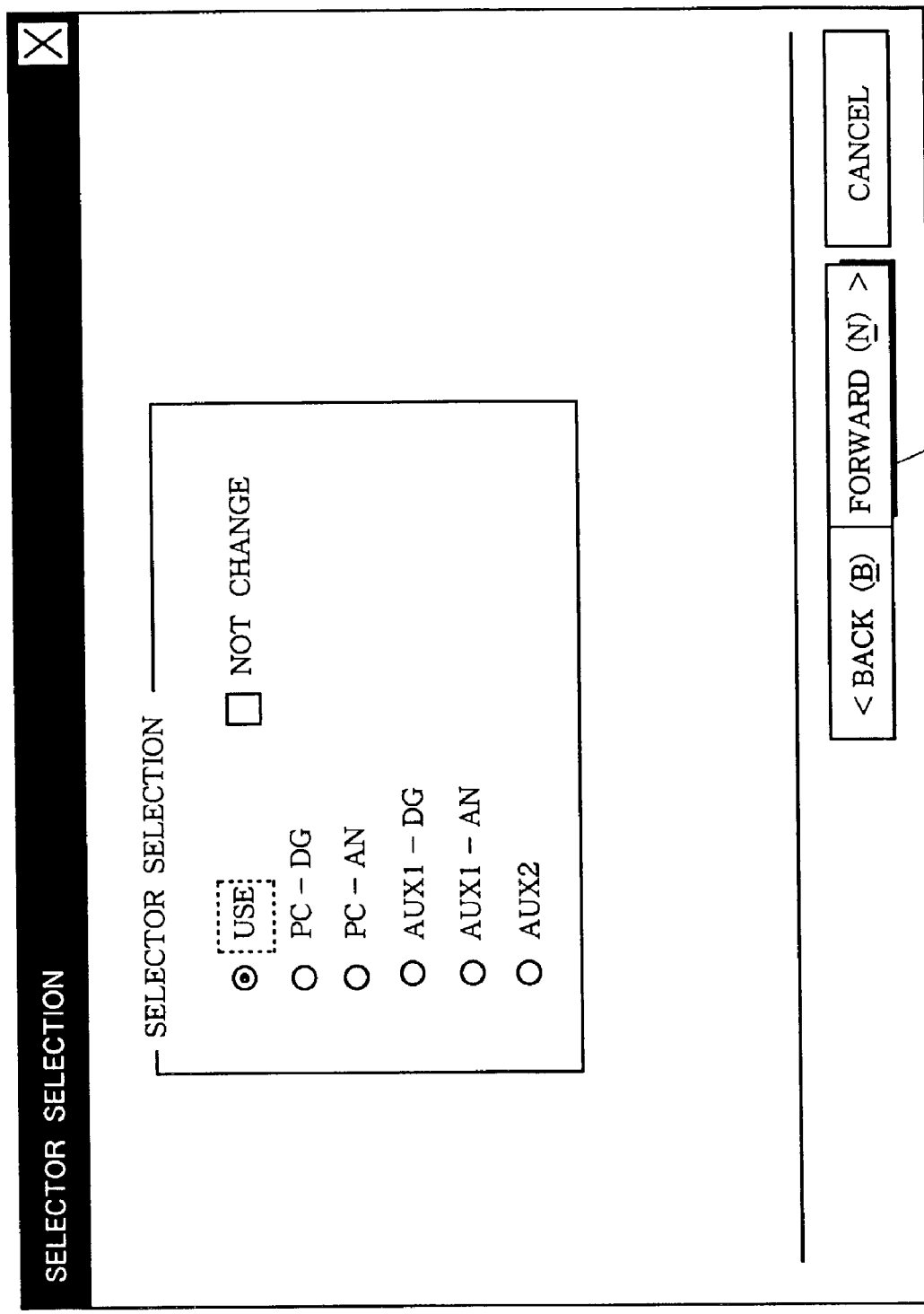
FIG. 17 is a diagram showing still another screen displayed on the display section of the personal computer when functions to be allocated to the customizing button are to be set.

In the instant embodiment, the setting operation for "function 1" is performed by selecting one of the sound sources to be connected to the audio apparatus 100, i.e. selecting from which of the sound sources connected to any one of the external-apparatus connecting terminals 115 audio signals are to be input to the audio apparatus 100. As illustrated in FIG. 16, the names corresponding to all the input terminals (selectors) provided on the audio apparatus 100 are displayed together so that the user can select any one of the input terminals (selectors) by manipulating the mouse and the like of the operation section 226. As also illustrated, option "not change" is displayed on the screen. This "not change" option means that even when the currently-selected customizing button has been depressed or operated by the user, the input terminal, which was being selected in the audio apparatus 100 immediately before the operation of the customizing button, is not to be changed to another input terminal. When such a "not change" option has been selected, flag value "1" is written into the "flag" area of "function 1" in the customized allocation information table of FIG. 10B. Thus, if the "not change" option has been selected, no process is carried out in the audio apparatus 100 for changing the input terminal, despite the depression of the currently-selected customizing button. If the "USB" has been selected for customized function setting as shown in FIG. 17 and when the customizing button in question has been operated, the audio apparatus 100 switches from the currently-selected input terminal to the USB connecting terminal 118 even when the currently-selected input terminal is any one of the external-apparatus connecting terminals 115 other than the USB connecting terminal 118.

After having caused the above-mentioned function (X) setting screen to be displayed on the display section 224, the CPU 220 shifts to a state for awaiting a selection of setting contents by the user, and then determines, at step Sa6, whether or not operation for selecting and setting contents of the function (X) has been performed by the user. If answered in the affirmative at step Sa6, i.e. if the user has clicked a "NEXT" button 96 on the screen of FIG. 16 or 17, the CPU 220 makes a further determination as to whether the function variable X equals N (X=N); note that N represents the greatest number of functions capable of being allocated to the customizing button in question (see FIG. 10).

Figure 18:
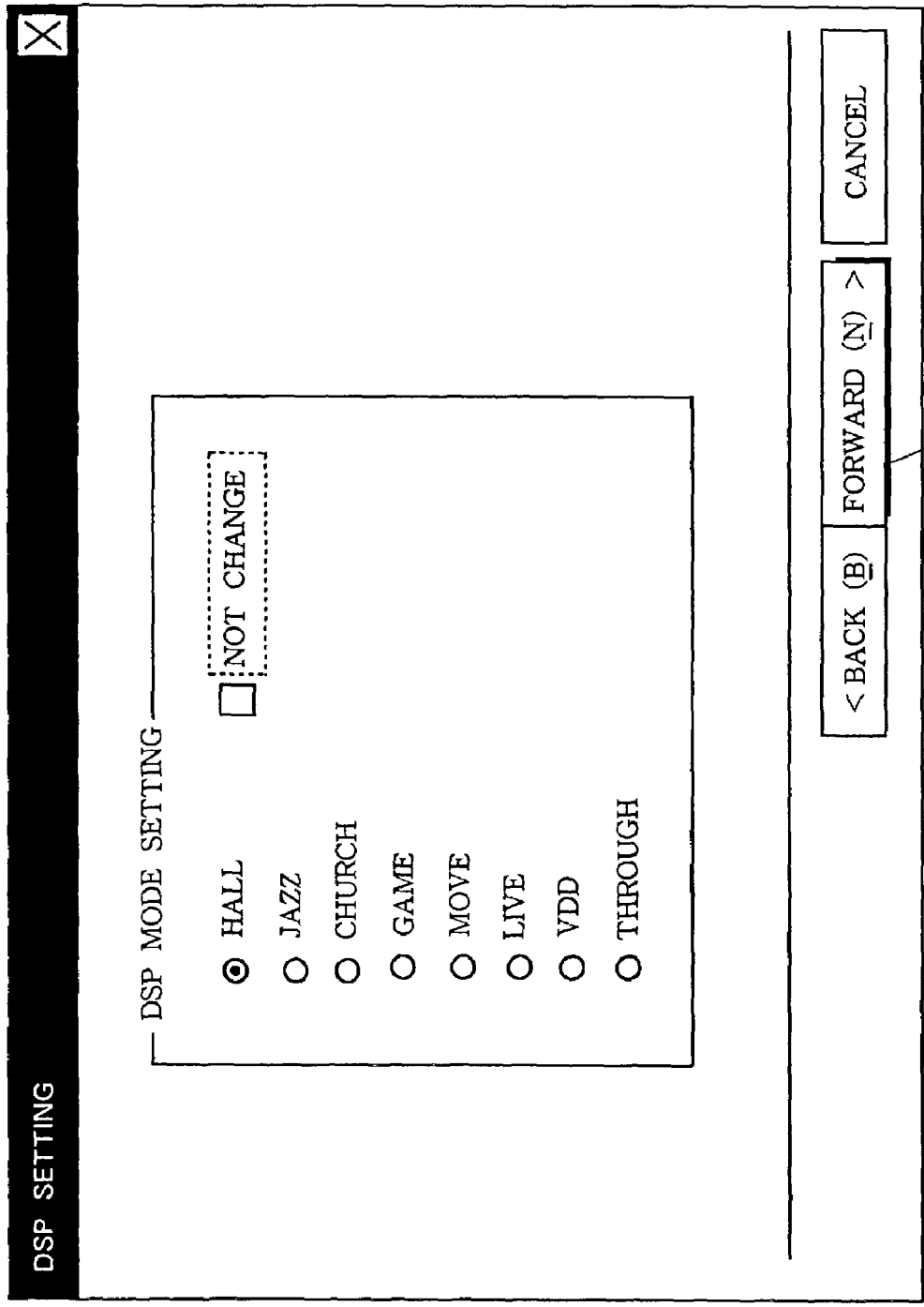
FIG. 18 is a diagram showing still another screen displayed on the display section of the personal computer when functions to be allocated to the customizing button are to be set.

Because X=1 in this case, the function variable X is incremented by one at step Sa8, and then a screen for setting "function 2" is displayed on the display section 224 at step Sa5. In this embodiment, the setting operation for "function 2" is performed by setting a particular type of the digital signal processing to be executed by the DSP section 108 of the audio apparatus 100, i.e. a particular DSP mode. As shown in FIG. 18, all DSP modes that can be performed by the DSP section 108 of the audio apparatus 100 are displayed together on the "function 2" setting screen, so that the user is allowed to select any one of the displayed DSP modes by manipulating the mouse and the like of the operation section 226 as appropriate. Further, as in the case of the "function 1" setting process, the user can select a "not change" option.

Figure 19:
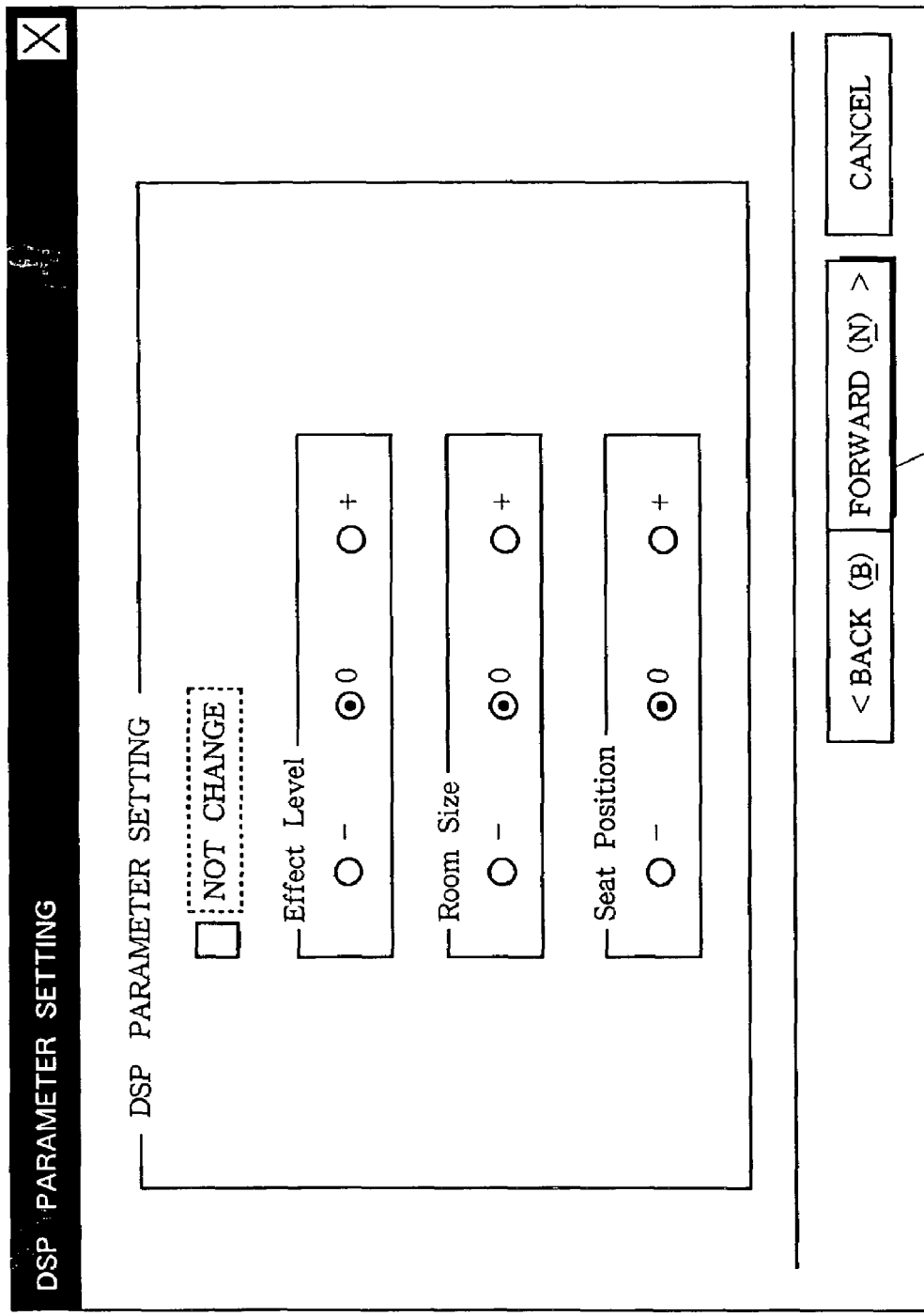
FIG. 19 is a diagram showing still another screen displayed on the display section of the personal computer when functions to be allocated to the customizing button are to be set.
Figure 20:
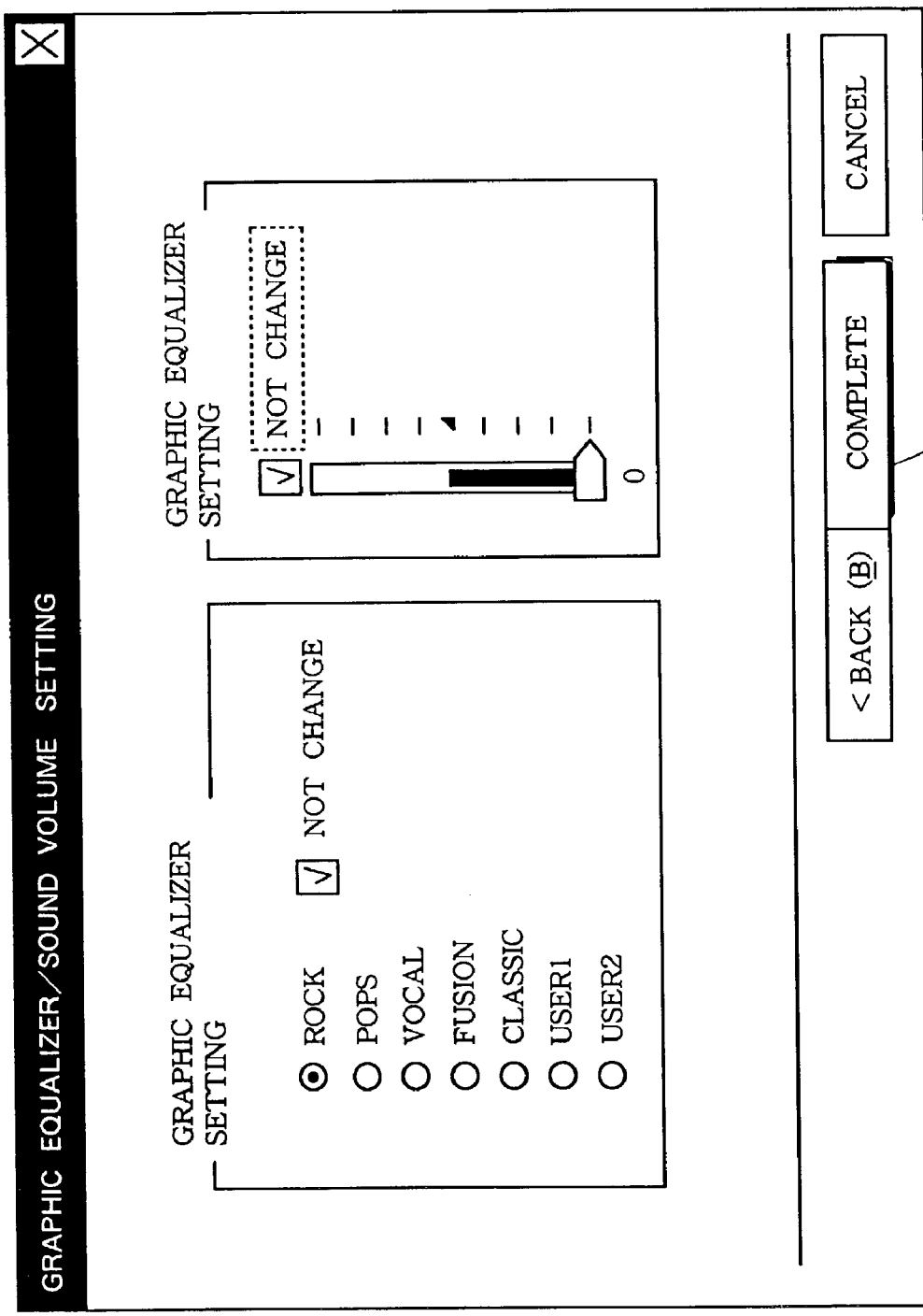
FIG. 20 is a diagram showing still another screen displayed on the display section of the personal computer when functions to be allocated to the customizing button are to be set.

As in the case of the "function 1" setting screen, if the user has clicked a "NEXT" button 97 on the "function 2" setting screen, the CPU 220 proceeds to step Sa5 so as to cause the display section 224 to display a screen for setting "function 3". In this embodiment, the setting operation for "function 3" is performed by setting various parameters for use in the DSP mode having been set by the "function 2" setting process. As shown in FIG. 19, all parameters that can be set in the DSP mode selected by the "function 2" setting process are displayed together on the "function 3" setting screen, so that the user is allowed to set desired values of these parameters by manipulating the mouse and the like of the operation section 226 as appropriate. Further, as in the case of the "function 1" setting process, the user can select a "not change" option.

As in the case of the "function 1" and "function 2" setting screens, if the user has clicked a "NEXT" button 98 on the "function 3" setting screen, the CPU 220 proceeds to step Sa5 so as to cause the display section 224 to display a screen for setting "function 4". In this embodiment, the setting operation for "function 4" is performed by setting a frequency characteristic (graphic equalizer characteristic) and sound volume. As shown in FIG. 19, all frequency characteristics (graphic equalizers) that can be selected and sound volume setting buttons are displayed on the "function 4" setting screen, so that the user is allowed to set a desired one of the graphic equalizers and sound volume by manipulating the mouse and the like of the operation section 226 as appropriate. Further, as in the case of the "function 1" setting process, the user can select a "not change" option.

In the instant embodiment, the maximum number N of the functions that can be allocated or set to each of the customizing buttons is set to four. Thus, when a "COMPLETE" button 99 has been clicked on the "function 4" setting screen (YES determination at step Sa6), the CPU 220 makes a determination, at step Sa7, as to whether the function variable X has equaled N (X=N). Because N=4 in this case, an YES determination is made at step Sa7, so that the CPU 220 creates setting information reflecting the settings made by the user in the above-described manner and transmits the setting information to the audio apparatus 100 at step Sa9.

If it is determined at step Sa3 above that the "transmit to PC" option has been selected by the user, i.e. that the user has requested customization of the selected customizing button as a button for remote-controlling the personal computer 200 rather than the audio apparatus 100, the CPU 220, at step Sa12, causes the display section 224 to display a screen for setting a function to be allocated to the selected customizing button. In the instant embodiment, the selected customizing button can be allocated any one of various functions performable by the above-mentioned audio-apparatus controlling application software that allows the personal computer 200 to control the audio apparatus 100. For example, it is possible to allocate, to the selected customizing button, such a function as to maximize or minimize the displayed size of the setting screen as shown in FIG. 13. Further, in a situation where a plurality of application software programs are being run by the operating system (e.g., "Windows" of Microsoft Corporation) and the setting screen of FIG. 13 displayed by the audio-apparatus controlling application software is hidden behind a screen of another application software program, it is possible to allocate, to the selected customizing button, such a function as to display the screen based on the audio-apparatus controlling application software in the front-most position in such a manner that the screen based on the audio-apparatus controlling application software can be visible in its entirety.

Figures 21, 22:
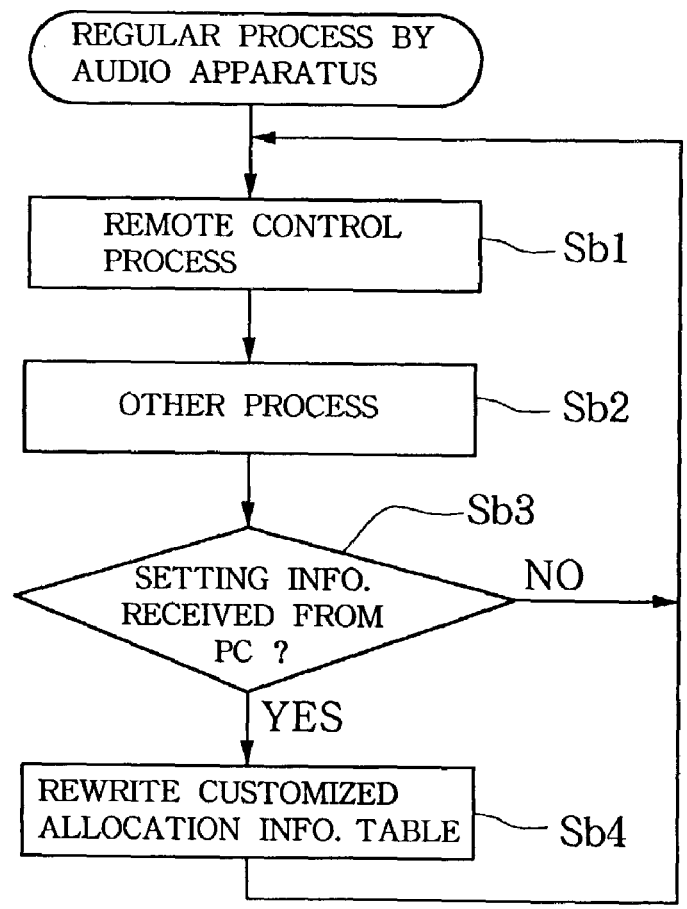
FIG. 21 is a diagram showing explanatory of a personal-computer function allocation table stored in the personal computer.
FIG. 22 is a flow chart showing a regular process performed by the audio apparatus.

After having caused the display section 224 to display the function setting screen for the personal computer 200, the CPU 220 shifts to a state for awaiting a selection of setting contents by the user, and then determines, at step Sa11, whether or not the function setting operation has been performed by the user. If the function setting operation has been performed by the user (YES determination at step Sa11), the function allocation information table of the personal computer 200 stored in the hard disk 223 is rewritten on the basis of the function allocated by the user. As shown in FIG. 21, a function allocation information table stored in the personal computer 200 (hereinafter "personal-computer function allocation information table") contains information indicative of a function to be allocated to each control command having been set to be transmitted to the personal computer 200. Such a personal-computer function allocation information table is prestored in the hard disk 223. The contents of this personal-computer function allocation information table are rewritten once the function setting process has been performed in the above-mentioned manner. In the illustrated example of FIG. 21, the personal-computer function allocation information table contains information such that, when control command C1 having been set to be transmitted to the personal computer 200 (in response to depression or operation of the customizing function button 167a) has been received, the CPU 220 carries out an operation for maximizing the size of the detailed setting screen (see FIG. 13).

If a "CANCEL" button is clicked on each of the screens shown in FIGS. 15 to 20, the customized function setting routine is ceased, and the CPU 220 reverts to the screen shown in FIG. 14. Further, if a "RETURN" button is clicked on each of the screens shown in FIGS. 15 to 20, the CPU 220 reverts to the preceding screen (i.e., screen immediately before the current screen) so that any desired function can be set again using the preceding screen.

B-1-2. Behavior of the Audio Apparatus:

Now, behavior of the audio apparatus 100 in the audio system 1 will be described focusing primarily on its operations when the customized allocation information table stored in the RAM 103 is rewritten on the basis of the setting information having been created by the personal computer 200 and then transmitted to the audio apparatus 100.

Once the audio apparatus 100 is turned on, the CPU 101 of the audio apparatus 100 reads out the control programs from the ROM 102 to thereby execute a regular process loop as shown in FIG. 22. In this regular process loop, the CPU 101 first carries out a remote control process at step Sb1. Namely, once a control command transmitted from the remote control signal transmitter (remote controller) 150 is received by the remote control signal reception section 107, the remote control process at step Sb1 performs a control process corresponding to the received control command. For example, when the user has operated the FM/AM switching button 171 of the remote control signal transmitter 150 and the control command corresponding to the user operation of the FM/AM switching button 171 has been received, the CPU 101 performs such a control process as to switch the broadcast wave to be received via the tuner 111. The control process to be performed in response to receipt of the control command is designated by reference to the allocation information table stored in the RAM 103.

Further, when the control command, for which flag value "2" indicating that the control command should be transmitted to the personal computer 200 is written in the "operation flag" area of the customized allocation information table (see FIG. 10B), has been received, the CPU 101 in the remote control process carries out an operation for transmitting the control command to the personal computer 200.

After completion of the above-mentioned remote control process, any one of various operations is carried out, at step Sb2, in the audio apparatus 100 depending on the situation. For example, when the operational state of the front panel of the audio apparatus 100 has been changed, an operation corresponding to the changed operational state is carried out. Namely, when one DSP mode has been changed to another by operation of the DSP operator 25 or up/down operator 28, a control process is performed for changing the DSP mode. Further, when a control signal related to setting of the DSP mode or the like has been received from the personal computer 200, an operation corresponding to the received control signal is carried out.

Once any one of the above-mentioned operations has been carried out, a determination is made, at step Sb3, as to whether there has been received, from the personal computer 200, setting information for performing a function setting process on a given selected customizing button. If the setting information has been received from the personal computer 200 via the USB connecting terminal 118 and USB interface 112, the customized allocation information table stored in the RAM 103 is rewritten in accordance with the received setting information at step Sb4.

After that, the CPU 101 reverts to step Sb1, so that the CPU 101 executes the remote control process. The remote control process is carried out reflecting the rewritten contents of the customized allocation information table. Thus, the personal computer 200 makes settings for customizing the function of the customizing button 167a of the remote control signal transmitter 150, and the customized allocation information table is rewritten on the basis of the setting information indicative of the settings. Then, if the user depresses or operates the customizing button 167a, various functions having been set, via the personal computer 200, to be allocated to the customizing button 167a will be performed by the audio apparatus 100.

Because the above-described embodiment of the present invention is arranged to allow a plurality of functions to be allocated to each of the customizing buttons, only one depression or operation, by the user, of the customizing button can cause a plurality of functions to be implemented concurrently or in a collective fashion. With conventional audio apparatus that performs complicated digital signal processing on audio signals, there would be a need to set various parameter values and items to be selected, and making such a multiplicity of settings would involve complicated and troublesome operations, as discussed earlier in the introductory part of this patent specification. Therefore, by virtue of the novel arrangement of the present invention for permitting a multiplicity of settings by only one user depression or operation of the customizing button, the present invention can achieve extremely great benefits over the conventional audio apparatus.

Further, because the above-described embodiment of the present invention is arranged to use the personal computer 200 to allocate customized functions to each of the customizing buttons 167a, 167b and 167c of the remote control signal transmitter 150 belonging to the audio apparatus 100, it can eliminate a need for providing the audio apparatus 100 with function-allocation setting screens and operators. Heretofore, there has been proposed a similar technique in accordance with which customizing buttons, to which a user can freely allocate desired functions, are provided on a remote control signal transmitter belonging to a television set in such a manner that customized function setting can be performed with reference to information displayed on the television screen. Thus, one may think of allocating customized functions to the customizing buttons by use of a small display screen provided on an ordinary audio apparatus. However, in order to provide a user with an environment which significantly facilitates the customized function allocation, a great display screen and operation means of good operability would be required. If such components are added to the audio apparatus, the audio apparatus would become complicated in construction and also have an increased size. By contrast, the above-described embodiment of the present invention, without requiring complicated construction of the audio apparatus 100, allows the user to allocate desired customized functions to the customizing buttons, under a comfortable environment, by referring to a relatively large display screen of the display section 224 and using the keyboard, mouse, etc. of the operation section 226 having good operability.

Also, for customizing the functions of the customizing buttons 167a, 167b and 167c of the remote control signal transmitter 150 in the described embodiment as noted above, the remote control signal transmitter 150 only has to transmit a control command corresponding to the depressed or operated customizing button. Thus, the remote control signal transmitter 150 in the described embodiment only has to be equipped with a simple function for transmitting control commands preset to the individual buttons, and it is not necessary for the remote control signal transmitter 150 to have complicated construction such as for managing contents of control processes corresponding to the control commands.

B-2. Behavior in Controlling the Personal Computer:

The following paragraphs describe behavior of the audio system 1 when the audio system 1 remote-controls the personal computer 200, connected with the audio apparatus 100, in response to user operation of the remote control signal transmitter 150.

As described above, the instant embodiment can allocate desired functions to the customizing buttons 167a, 167b and 167c provided on the remote control signal transmitter 150 and make settings such that the control command output from the remote control signal transmitter 150 in response to user operation of any one of the customizing buttons 167a, 167b and 167c is transferred from the audio apparatus 100 to the personal computer 200 (settings specified by flag value "2" in the operation flag area of the customized allocation information table shown in FIG. 10) (see step Sb1 of FIG. 22).

The CPU 220 of the personal computer 200 is arranged to control operation of application software and operating system being executed thereby, on the basis of control commands transferred from the audio apparatus 100, as set forth above.

Figure 23:
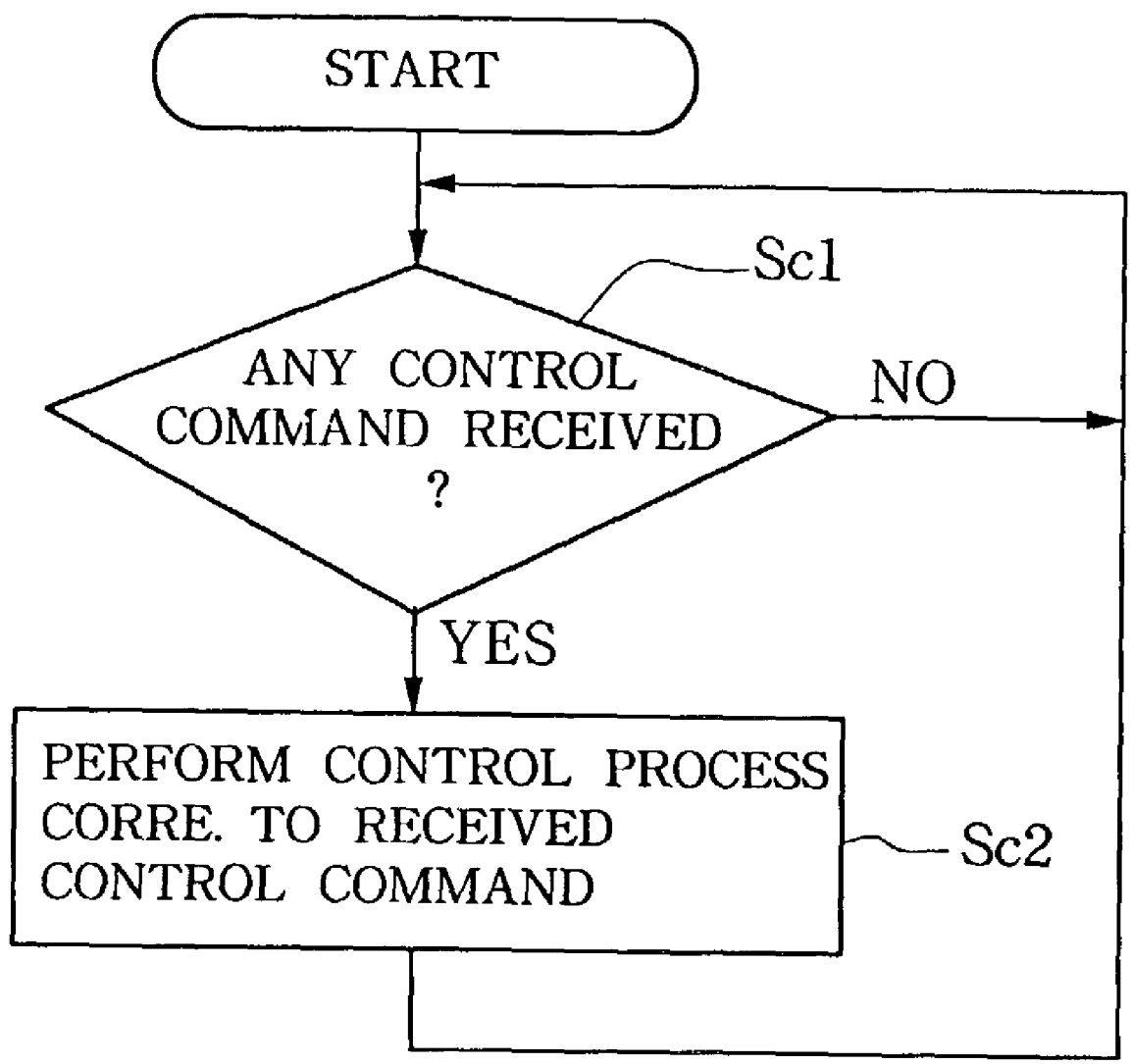
FIG. 23 is a flow chart showing a process performed by the personal computer in response to user operation via the remote control signal transmitter.

FIG. 23 shows an exemplary operational sequence of a loop process in the audio system 1 for remote-controlling the personal computer 200. As shown, the CPU 220 of the personal computer 200 makes a determination, at step Sc1, as to whether any control command has been received from the audio apparatus 100. If a control command has been received from the audio apparatus 100 (YES determination at step Sc1), i.e. if the user has depressed or operated any one of the customizing buttons 167*a*, 167*b* and 167*c* on the remote control signal transmitter 150 which has been customized for signal transmission to the personal computer PC, the CPU 220 carries out a control process allocated to the received control command, at step Sc2.

Here, the hard disk 223 of the personal computer 200 has prestored therein the personal-computer function allocation information table (see FIG. 21) having been set in the above-described manner. The CPU 220 makes reference to the personal-computer function allocation information table to identify the control process to be performed in response to the received control command, and then performs the thus-identified control process. For example, in a case where the settings shown in FIG. 21 are registered in the personal-computer function allocation information table and when control command C1, issued in response to user operation of the customizing button 167*a*, has been received from the audio apparatus 100, the CPU 220 of the personal computer 200 carries out an operation for maximizing the detailed setting screen (see FIG. 13).

The instant embodiment allows the personal computer 200 to be controlled with the remote control signal transmitter 150 belonging to the audio apparatus 100. Heretofore, there has been proposed a similar audio system where an audio apparatus and a personal computer are interconnected so that the audio apparatus can be controlled via the personal computer. When a user wants to make desired settings in such a conventional audio system, it is sometimes necessary to give setting instructions to both of the audio apparatus 100 and personal computer 200. Even in such a situation, the conventional audio system can not remote-control the personal computer although it can remote-control the audio apparatus by use of the remote control signal transmitter belonging to the audio apparatus, so that the user must bother to move to the neighborhood of the personal computer to thereby operate the mouse and keyboard. As compared to the conventional audio system, the audio system 1 of the present invention can control both the audio apparatus 100 and the personal computer 200, using the remote control signal transmitter 150 belonging to the audio apparatus 100, and thus it can provide the user with a handy, easy-to-use remote control signal transmitter 150.

C. Modifications:

It should be appreciated that the present invention is not limited to the above-described embodiment alone and various modifications of the present invention are also possible without departing from the basic principles of the invention.

(Modification 1)

The above-described embodiment is arranged to make settings, in the customized allocation information table (FIG. 10B), such that control is performed for implementing a plurality of customized functions in response to a control command corresponding to any selected one of the customizing buttons. In an alternative, there may be provided a modified customized allocation information table, as shown in FIG. 24, contents of which can be set via the personal computer 200.

As shown in FIG. 24, in this modified customized allocation information table, a plurality of "operating time/date conditions" can be set for each control command, and the above-mentioned items, such as "operation flag", "function 1", . . . , "function N", can be set for each of the thus-set operating time/date conditions (in the illustrated example, two such conditions per control command). In this case, each of the "operating time/date conditions" defines a time zone as shown, and when a control command has been received during the time zone defined in the operating time/date condition, the "operation flag", "function 1", . . . , "function N" written in association with the operating time/date condition are referred to so that a control process corresponding to the received control command is performed on the basis of the thus referred to "operation flag", "function 1", . . . , "function N". For example, in the case where control command 1 is received on a weekday between the hours of 9:00 and 20:00 (9 a.m. and 8 p.m.), the "operation flag", "function 1", . . . , "function N" written in an upper one of two rows allotted to control command 1 are referred to, on the basis of which the control process corresponding to the received control command is performed. In case control command 1 is received on a holiday, the "operation flag", "function 1", . . . , "function N" written in a lower one of the rows allotted to control command 1 are referred to, on the basis of which the control process corresponding to the received control command is performed.

The use of such a customized allocation information table of FIG. 24 can allocate, to each of the customizing buttons, a plurality of functions that differ for each on the operating time/date conditions. For example, settings can be made such that a sound volume parameter is set to a relatively great value for the time zone between 9:00 and 20:00 and set to a smaller value for a nighttime zone after 20:00 (8 p.m.). By such settings, the sound volume can be automatically controlled to an appropriate value even when the user has depressed the customizing button without particularly minding the time zone.

In a case where the audio apparatus 100 is equipped with a timekeeping function, the timekeeping function of the audio apparatus 100 may be used to identify the time and date when a control command has been received, and a determination may be made as to which of the operating time/date conditions the identified time and date meets, so as to perform control corresponding to the operating time/date condition. If, on the other hand, the audio apparatus 100 is equipped with no timekeeping function, the audio apparatus 100 may request supply of information that is indicative of the current time and date from the personal computer 200 at the time point when a control command has been received. Then, the audio apparatus 100, having received the information indicative of the current time and date transmitted from the personal computer 200, may determine which of the operating time/date conditions the received time and date information meets.

(Modification 2)

In the above-described embodiment, the remote control of the personal computer 200 by the remote control signal transmitter 150 concerns control related only to the audio-apparatus controlling application software, i.e. control related only to the audio apparatus 100. Alternatively, operation of other application software and operating system, which can be executed by the personal computer 200, may be remote-controlled using the remote control signal transmitter 150.

In this case, contents of the control of the audio-apparatus controlling application software and operating system may be written in the "function" areas of the personal-computer function allocation information table (see FIG. 21). For example, if settings for performing a music-CD reproduction function provided by the operating system are written in the one of the "function" areas of the personal-computer function allocation information table, the music-CD reproduction function can be triggered in the personal computer 200 as soon as the user operates the customizing button that is set to send the corresponding control command.

(Modification 3)

The above-described embodiment is arranged to transmit, to the personal computer 200, only control commands corresponding to the three customizing buttons 167*a*, 167*b* and 167*c*. In an alternative, arrangements may be made to permit transmission, to the personal computer 200, of control commands corresponding to all of the buttons provided on the remote control signal transmitter 150.

Figure 25:
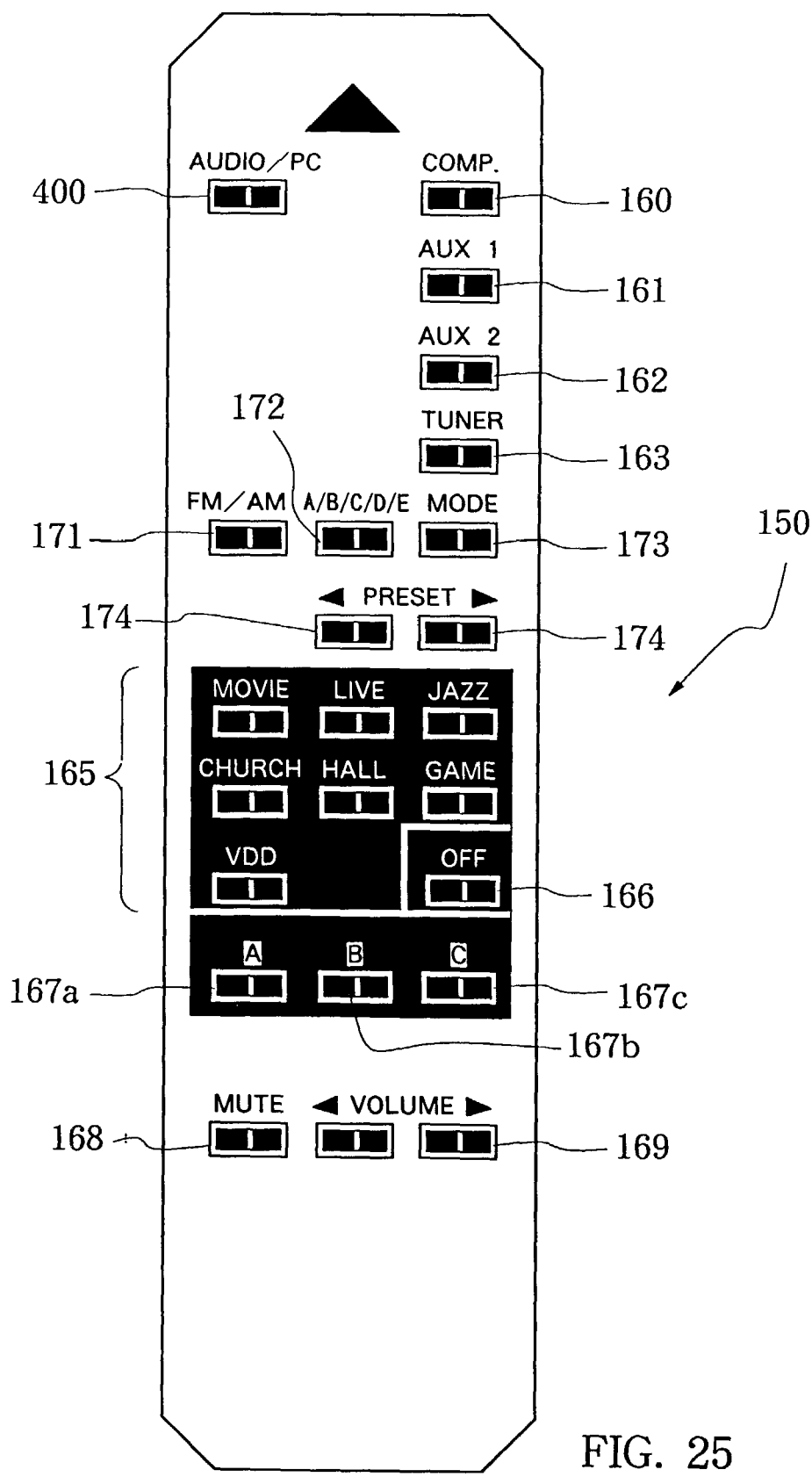
FIG. 25 is an external view showing a modification of the front panel of the remote control signal transmitter.

In the case where the arrangements are made to permit transmission, to the personal computer 200, of control commands corresponding to all the buttons provided on the remote control signal transmitter 150 as noted above, an "audio/PC" switching button 400 may be provided on the remote control signal transmitter 150, and the RAM 103 of the audio apparatus 100 may include a command destination information storage area for previously storing mode information indicative of whether or not the control commands are to be transmitted to the personal computer 200, as shown in FIG. 25. Once the audio/PC switching button 400 is depressed or operated by the user and the control command corresponding to the operation of the audio/PC switching button 400 is received by the audio apparatus 100, the mode information stored in the command destination information storage area of the RAM 103 is rewritten from the current transmission mode to the other current transmission mode. Namely, if the current transmission mode is one (transmission mode) for transmitting the control command to the personal computer 200, then the mode information stored in the command destination information storage area is rewritten into the other mode (non-transmission mode) for using the control command within the audio apparatus 100, so as to change the settings. Conversely, if the current transmission mode is the non-transmission mode for using the control command within the audio apparatus 100, then the mode information stored in the command destination information storage area is rewritten into the transmission mode for transmitting the control command to the personal computer 200, so as to change the settings.

Once one of the buttons other than the audio/PC switching button 400 is operated by the user on the remote control signal transmitter 150 and the control command corresponding to the operation of the button is received by the audio apparatus 100, the CPU 101 of the audio apparatus 100 makes reference to the mode information stored in the command destination information storage area of the RAM 103. If the transmission mode is currently set, the CPU 101 of the audio apparatus 100 transmits the received control command to the personal computer 200. If, on the other hand, the non-transmission mode is currently set, the CPU 101 refers to the allocation information table (see FIG. 10) stored in the RAM 103 and performs a control process corresponding to the received control command.

With the above-described arrangements, the great many buttons provided on the remote control signal transmitter 150 can be used not only for control of the audio apparatus 100 but also for control of the personal computer 200. For this purpose, however, functions have to be previously allocated to each of the control commands corresponding to the great many buttons provided on the remote control signal transmitter 150, in the personal-computer function allocation information table stored in the hard disk 223 of the personal computer 200. By the arrangement for allowing the great many buttons of the remote control signal transmitter 150 to be used for control of the personal computer 200, a function of moving a cursor in an up-and-down direction on the display screen of the display section 224 of the personal computer 200 in place of the mouse can be allocated to a selected one of the buttons, such as the volume up/down buttons 169, provided on the transmitter 150.

Note that the remote control signal transmitter 150 may be also provided with a direction button for moving the cursor in a left-and-right direction on the precondition that the remote control signal transmitter 150 is used for control of the personal computer 200.

(Modification 4)

Further, when customizing the functions of the customizing buttons of the remote control signal transmitter 150 via the personal computer 200, the above-described embodiment displays the screens of FIGS. 15 to 20 on the display section 224 so that the user can perform selecting/setting operation separately for each of the individual functions. As a modification, the customized function setting operations may be carried out in accordance with the following procedures, provided that WWW (World Wide Web) browser software is stored in the hard disk 223 of the personal computer 200.

Figure 26:
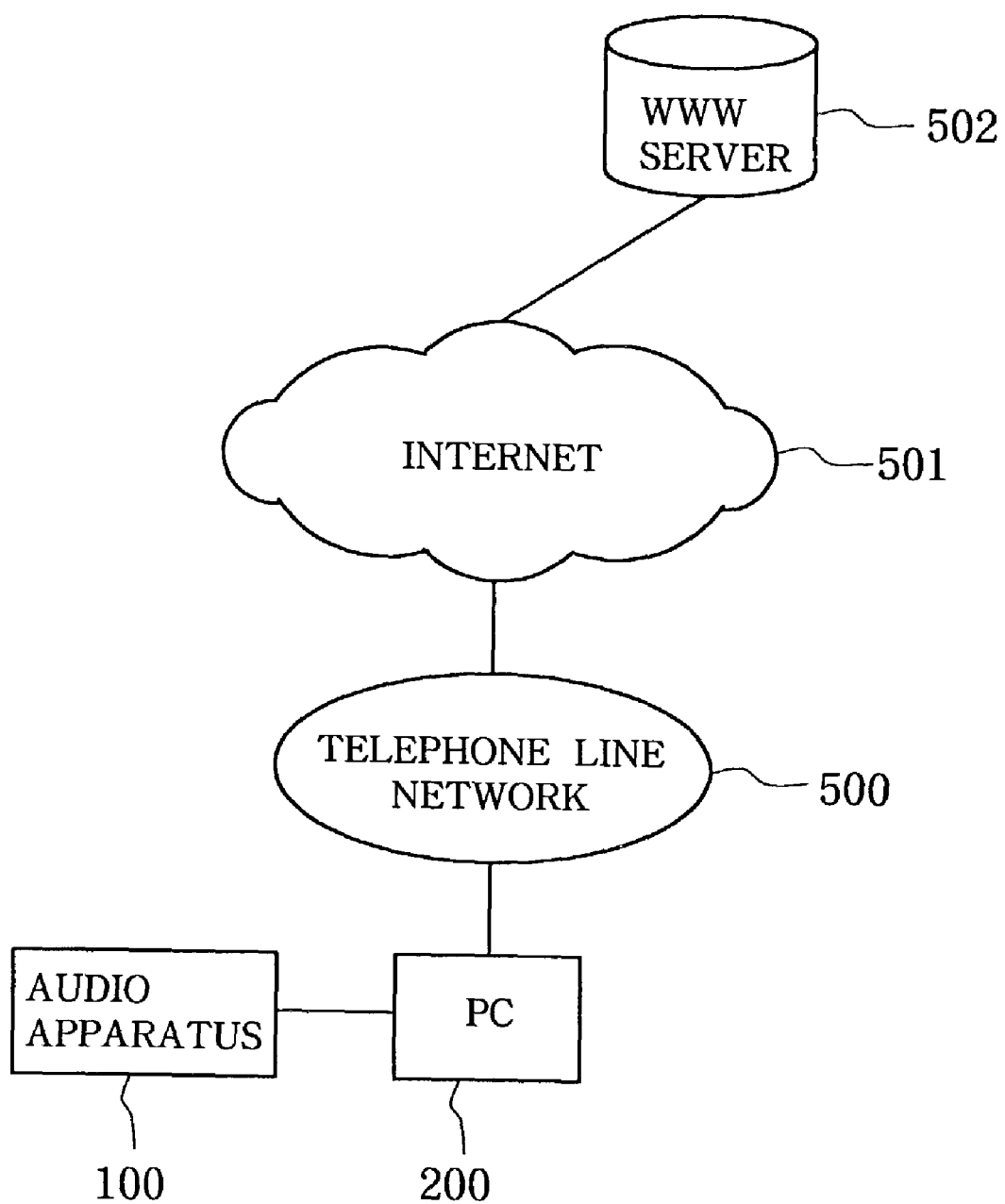
FIG. 26 is a block diagram showing a system configuration for setting functions to the customizing button by use of the Internet.

FIG. 26 is a diagram showing a system where the modified customized function setting process is performed. As shown, the personal computer 200 is connected to the Internet 501 by way of a telephone line network 500 and can carry out data communication with a WWW server 502 that is also connected to the Internet 501.

The WWW server 502 is a server storing Web pages provided by a manufacturer or distributor of the audio apparatus 100, and the personal computer 200 can read the Web pages by accessing the Internet 501 by designating a predetermined URL (Uniform Resource Locator).

Figure 27:
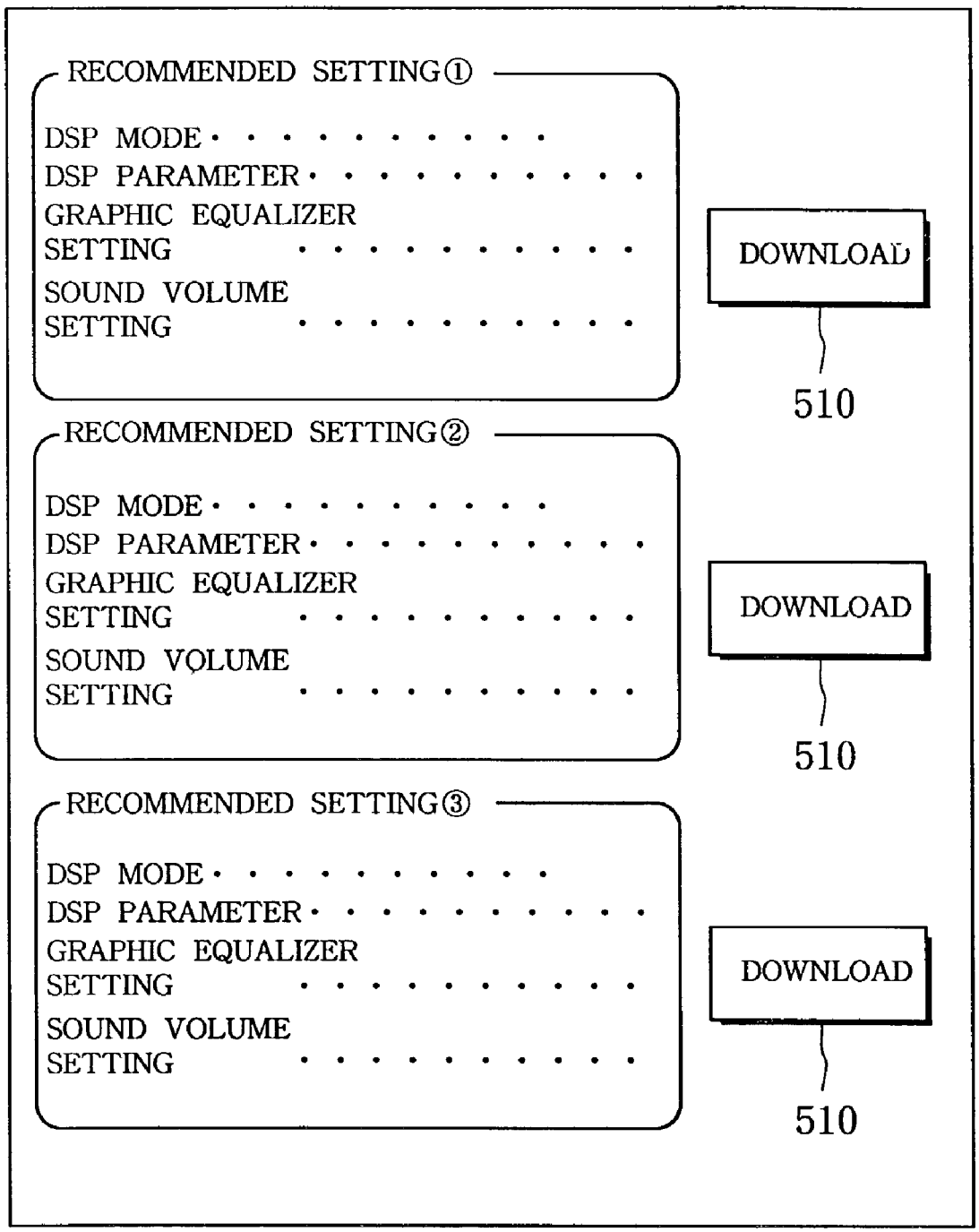
FIG. 27 is a diagram showing a screen displayed on the display section of the personal computer when functions to be allocated to the customizing button are to be set using the Internet.

Screen as shown in FIG. 27 is displayed on the display section 224 of the personal computer 200 having downloaded the Web pages. As shown, this screen presents contents of customized function setting recommended by the server of the web pages, and a "download" button 510 is displayed alongside the display of the contents of the recommended customized function setting.

Once the user clicks the download button 510 after making reference to the contents of the recommended customized function setting on the displayed screen, the CPU 220 of the personal computer 200 requests the WWW server 502 to download recommended setting information corresponding to the clicked download button 510. In response to the request for the recommended setting information from the personal computer 200, the WWW server 502 transmits the requested setting information to the personal computer 200. When the recommended setting information has been downloaded, a screen as shown in FIG. 28 is displayed on the display section 224 of the personal computer 200. As shown, this screen displays, in addition to a message to the effect that the downloading has been completed, a message "is the setting information to be transmitted to the audio apparatus for customized function setting" in order to prompt the user to instruct the customized function setting. Once the user clicks a "execute setting" button 515, the CPU 220 creates setting information on the basis of the downloaded recommended setting information and then transmits the thus-created setting information to the audio apparatus 100. Thus, in the audio apparatus 100, the customized allocation information table is rewritten in accordance with the setting information transmitted from the personal computer 200 in the same manner as in the above-described embodiment. In this way, customized function setting of the customizing buttons 167*a*, 167*b* and 167*c* can be performed.

Because the customized function setting of the remote control signal transmitter 150 can be performed by the personal computer 200 connectable to a communication network, such as the Internet, as noted above, the present invention permits the customized function setting by obtaining recommended setting information from another personal computer or server connected to the Internet 501. The present invention also allows setting information to be exchanged, via the Internet 501, between the user of the audio apparatus 100 and another user possessing a similar audio apparatus.

Further, where a Web page depicting Help information on the function customizing procedures is stored in the WWW server 502 and if there is some point the user can not understand regarding operations for customized function setting or the like, the user can download the above-mentioned Web page to the personal computer 200 to display the Help information, by using the personal computer 200 connectable to the Internet 501 for customized function setting of the remote control signal transmitter 150. Then, the user can go forward with the customized function setting operations while referring to the Help information displayed on the display section 224.

(Modification 5)

Whereas the embodiment has been described above in relation to the case where the USB interface is used between the audio apparatus 100 and the personal computer 200, various other interface of different interface standards may be used between the audio apparatus 100 and the personal computer 200; for example, wireless communication, such as by the IrDA standard (infrared) or Bluetooth standard, may be employed. Further, the audio apparatus 100 and remote control signal transmitter 150 may be interconnected via a signal cable rather than wireless communication.

(Modification 6)

The audio apparatus 100 is not limited to the one constructed in the above-mentioned manner, and may be constructed as an amplifier, tuner, CD player, DVD (Digital Versatile Disk) player or the like.

(Modification 7)

The audio-apparatus controlling application software, for implementing the customized function setting and remote control of the personal computer 200 in the above-described embodiment, may be supplied to interested users in a CD-ROM, DVD-ROM or other recording medium storing the application software. Further, the audio-apparatus controlling application software may be installed by reproducing a semiconductor memory, disk or other recording medium where the application software is stored temporarily or permanently.

In summary, the present invention arranged in the above-described manner can implement a user-friendly, convenient remote control signal transmitter of simple construction without requiring cumbersome remote control setting.

What is claimed is:

1. A method for controlling parameters that modify an acoustic characteristic of a sound system to be set in an audio apparatus by performing remote control by using a remote control signal transmitter wherein said audio apparatus comprises a volatile memory storing first settings of a plurality of first parameters that modify the acoustic characteristic of the sound system, a non-volatile memory storing second settings of a plurality of second parameters that modify the acoustic characteristic of the sound system said first settings and second settings including setting of parameters for controlling switching of input of said audio system, a controlled section operating in accordance with values of said first parameters of said first settings stored in the volatile memory, a signal reception section and a control section, said method comprising:

a step of receiving a control signal transmitted by wireless transmittance from said remote control signal transmitter, wherein said remote control signal transmitter comprises a plurality of operators to which remote control codes which are different from each another are respectively allotted, and a transmitter which transmits, by wireless transmittance, a control signal which corresponds to a predetermined one of the remote control codes allotted to said operators by operating the operator of said predetermined remote control code;

a step of analyzing, in said control section, contents of the code of the control signal received by said signal reception section;

a step of storing said plurality of first parameters stored in said volatile memory when the control signal analyzed in said analyzing step indicates instruction for storing said first settings; and a step of reading out second settings of said plurality of second parameters from said non-volatile memory when the control signal analyzed in said analyzing step indicates instruction for renewal to said second settings, renewing said first settings of said plurality of first parameters stored in said volatile memory by said second settings of said plurality of second parameters, and modifying the acoustic characteristics of the sound system using the second parameters, whereby said controlled section operates in said accordance with values of said second settings of said plurality of second parameters which have been renewed in said volatile memory.

2. An audio apparatus comprising:

a volatile memory storing first settings of a plurality of first parameters that modify an acoustic characteristic of a sound system;

a non-volatile memory storing second settings of a plurality of second parameters that modify an acoustic characteristic of the sound system;

a controlled section operating in accordance with values of first parameters of said first settings stored in said volatile memory;

a signal reception section receiving a control signal transmitted by wireless transmittance from a remote controller signal transmitter, wherein said remote control transmitter comprises a plurality of operators to which remote control codes, which are different from one another, are respectively allotted, and a transmitter which transmits, by wireless transmittance, a control signal which corresponds to a predetermined one of the remote control codes allotted to said operators by operating the operator of said predetermined remote control code; and a control section analyzing contents of the code of the control signal received by said signal reception section, storing, when the analyzed control signal indicates instruction for storing said first settings, said plurality of first parameters of said first settings stored in said volatile memory in said non-volatile memory, and reading out when the analyzed control signal indicates instruction for renewal to said second settings, said second settings of said plurality of second parameters from said non-volatile memory, renewing said first settings of said plurality of first parameters stored in said volatile memory by said second settings of said plurality of second parameters and modifying the acoustic characteristics of the sound system using the second parameters, whereby said controller section operates in accordance with values of said second settings of said plurality of second parameters which have been renewed in said volatile memory.

3. An audio apparatus as claimed in claim 2 wherein said control section measures a length of time over which the control signal transmitted from said remote control signal transmitter is continuously detected, and when the control signal has been continuously detected for more than a predetermined time length, said control section determines the control signal to be the storage instruction, whereas when the control signal has been continuously detected for less than the predetermined time length, said control section determines the control signal to be the reproduction instruction.

4. An audio apparatus as claimed in claim 2 wherein said apparatus is an audio amplifier, and the plurality of parameters include parameters pertaining to two of surround setting, sound volume selling and/or frequency characteristics setting parameters.

5. An audio apparatus as claimed in claim 2 wherein when said signal reception section has received the predetermined reproduction instruction indicated by the control signal from said remote control signal transmitter while a main power supply for driving said controlled section is not in an ON state, said control section also performs control to turn on the main power supply.

6. A system, comprising:
a remote control signal transmitter used for remote controlling an audio apparatus, comprising:
a first operator to which a first remote control code is allotted and which is used for controlling one parameter that modifies an acoustic characteristic of a sound system set in said audio apparatus;
a second operator to which a second remote control code which is different from said first remote control code and which is used for controlling, in package, settings of a plurality of parameters that modify an acoustic characteristic of the sound system used in said audio apparatus;
a transmitter transmitting, by wireless transmittance, a first control signal corresponding to said first remote control code to said audio apparatus by operating said first operator and transmitting, by wireless transmittance, a second control signal corresponding to said second remote control code to said audio apparatus by operating said second operator;

said audio apparatus including:
a volatile memory storing first settings of a plurality of first parameters that modify an acoustic characteristic of the sound system,
a non-volatile memory storing second settings of a plurality of second parameters that modify an acoustic characteristic of the sound system,
a controlled section operating in accordance with values of said first parameters of said first settings stored in said volatile memory,
a signal reception section receiving said first and second control signals transmitted by wireless transmittance from said remote control signal transmitter,
a control section analyzing contents of the code of the first control signal and, in accordance with result of the analysis, controlling one of said first parameters of said first settings stored in said volatile memory;
and analyzing contents of the code of the second control signal and, when said second control signal indicates storing of said first settings, storing, in accordance with said second control signal, said first parameters of said first settings stored in said volatile memory in said non-volatile memory, and when said second control signal indicates instruction of renewal of said second settings, reading out said second settings of said second parameters from said non-volatile memory, renewing said first settings of said plurality of first parameters stored in said volatile memory by said second settings of said plurality of second parameters and modifying the acoustic characteristics of the sound system using the second parameters, whereby said controlled section operates in accordance with values of said second settings of said plurality of second parameters which have been renewed in said volatile memory.

7. A system as defined in claim 6, wherein said second operator is used for both of transmittance of said second control signal indicating renewal instruction concerning settings of said parameters and of transmittance of said second control signal indicating storage instruction concerning settings of said parameters.

8. The method of claim 1, said first settings and said second settings including setting of parameters for controlling switching of input of said audio apparatus.

9. The audio apparatus of claim 2, said first settings and said second settings including setting of parameters for controlling switching of input of said audio apparatus.

10. The system of claim 6, said first settings and said second settings including setting of parameters for controlling switching of input of said audio apparatus.

* * * * *

UNITED STATES PATENT AND TRADEMARK OFFICE
CERTIFICATE OF CORRECTION

PATENT NO. : 7,191,024 B2 Page 1 of 1
APPLICATION NO. : 10/038029
DATED : March 13, 2007
INVENTOR(S) : Takanori Shimizu It is certified that error appears in the above-identified patent and that said Letters Patent is hereby corrected as shown below:

On title page, item 75 Inventor
delete "Masaya Kano, Hamamatsu (JP);"

Signed and Sealed this

Twenty-ninth Day of May, 2007

JON W. DUDAS
*Director of the United States Patent and Trademark Office*